US012335768B2

(12) United States Patent
Abedini et al.

(10) Patent No.: US 12,335,768 B2
(45) Date of Patent: Jun. 17, 2025

(54) ESTIMATION AND UTILIZATION OF A BLOCK FADING WIRELESS CHANNEL

(71) Applicant: QUALCOMM incorporated, San Diego, CA (US)

(72) Inventors: Navid Abedini, Basking Ridge, NJ (US); Jianghong Luo, Skillman, NJ (US); Junyi Li, Fairless Hills, PA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/535,503

(22) Filed: Nov. 24, 2021

(65) Prior Publication Data

US 2023/0164616 A1    May 25, 2023

(51) Int. Cl.
*H04W 28/02* (2009.01)
*H04L 1/20* (2006.01)
*H04W 36/30* (2009.01)

(52) U.S. Cl.
CPC ........... *H04W 28/0231* (2013.01); *H04L 1/20* (2013.01); *H04W 28/0247* (2013.01); *H04W 36/305* (2018.08)

(58) Field of Classification Search
CPC ......... H04W 28/0231; H04W 28/0247; H04W 36/305; H04L 1/20
See application file for complete search history.

(56) References Cited

U.S. PATENT DOCUMENTS

| | | | | |
|---|---|---|---|---|
| 5,513,221 | A * | 4/1996 | Parr | H04B 7/005 375/232 |
| 11,743,743 | B2 | 8/2023 | Luo et al. | |
| 2009/0021521 | A1 * | 1/2009 | Sorgard | G06T 9/00 345/582 |
| 2009/0143008 | A1 * | 6/2009 | Hottinen | H04B 7/0619 455/11.1 |
| 2011/0051695 | A1 * | 3/2011 | Dinan | H04W 72/56 370/336 |

(Continued)

FOREIGN PATENT DOCUMENTS

WO    WO-0165709 A1    9/2001

OTHER PUBLICATIONS

Partial International Search Report—PCT/US2022/078890—ISA/EPO—dated Feb. 15, 2023.

(Continued)

*Primary Examiner* — Luat Phung
(74) *Attorney, Agent, or Firm* — Holland & Hart LLP/QUALCOMM Incorporated

(57) ABSTRACT

Methods, systems, and devices for wireless communications are described. A first wireless device (e.g., user equipment (UE), base station) may determine a block fading pattern associated with a communication link between the first wireless device and a second wireless device, the block fading pattern including a pattern of fluctuating channel quality. The first wireless device may selectively adjust one or more communications parameters for communicating with the second wireless device over the communication link based on the determined block fading pattern. The first wireless device may then communicate with the second wireless device over the communication link based at least in part on the one or more adjusted communications parameters.

34 Claims, 17 Drawing Sheets

(56) References Cited

U.S. PATENT DOCUMENTS

| | | | |
|---|---|---|---|
| 2011/0312358 A1* | 12/2011 | Barbieri | H04W 24/10 |
| | | | 455/507 |
| 2012/0300661 A1* | 11/2012 | Asplund | H04W 72/542 |
| | | | 370/252 |
| 2013/0223319 A1* | 8/2013 | Lee | H04W 72/30 |
| | | | 370/312 |
| 2014/0092952 A1* | 4/2014 | Aguilar-Arreola | |
| | | | H04L 25/03878 |
| | | | 375/233 |
| 2016/0119924 A1 | 4/2016 | Lindoff et al. | |
| 2016/0338010 A1* | 11/2016 | Rico Alvarino | H04L 5/1469 |
| 2019/0149295 A1 | 5/2019 | Wang et al. | |
| 2019/0254076 A1* | 8/2019 | Siomina | H04W 76/27 |
| 2020/0260469 A1 | 8/2020 | Sirkka et al. | |
| 2022/0038169 A1* | 2/2022 | Ma | H04W 24/08 |
| 2022/0255673 A1* | 8/2022 | Hunukumbure | H04L 1/0015 |
| 2023/0043262 A1* | 2/2023 | Jung | H04W 16/22 |
| 2023/0337278 A1 | 10/2023 | Wang et al. | |

OTHER PUBLICATIONS

International Search Report and Written Opinion—PCT/US2022/078890—ISA/EPO—Apr. 11, 2023.

Nam Y-H., et al., "Evolution of Reference Signals for LTE-Advanced Systems", IEEE Communications Magazine, IEEE Service Center, Piscataway, NJ, US, Feb. 9, 2012, 7 pages, Feb. 1, 2012, pp. 132-138, vol. 50, No. 2, XP011417049, Feb. 1, 2012, ISSN: 0163-6804, DOI: 10.1109/MCOM.2012.6146492, section "UE-Specific Reference Signals", first paragraph.

* cited by examiner

ESTIMATION AND UTILIZATION OF A BLOCK FADING WIRELESS CHANNEL

INTRODUCTION

The following relates to wireless communication, and more specifically to managing wireless communications affected by block fading.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first wireless device is described. The method may include determining a block fading pattern associated with a communication link between the first wireless device and a second wireless device. In some examples, the block fading pattern may include a pattern of fluctuating channel quality. In some examples, the method may include communicating with the second wireless device over the communication link based on one or more adjusted communications parameters. The one or more communications parameters may be adjusted based on the determined block fading pattern.

An apparatus for wireless communications at a first wireless device is described. The apparatus may include a processor and memory coupled with the processor. The processor and memory may be configured to determine a block fading pattern associated with a communication link between the first wireless device and a second wireless device. In some examples, the block fading pattern may include a pattern of fluctuating channel quality. The processor and memory may be further configured to communicate with the second wireless device over the communication link based on one or more adjusted communications parameters. In some examples, the one or more communications parameters may be adjusted based on the determined block fading pattern.

Another apparatus for wireless communications at a first wireless device is described. The apparatus may include means for determining a block fading pattern associated with a communication link between the first wireless device and a second wireless device. In some examples, the block fading pattern may include a pattern of fluctuating channel quality. The apparatus may include means for communicating with the second wireless device over the communication link based on one or more adjusted communications parameters. In some examples, the one or more communications parameters may be adjusted based on the determined block fading pattern.

A non-transitory computer-readable medium storing code for wireless communications at a first wireless device is described. The code may include instructions executable by a processor to determine a block fading pattern associated with a communication link between the first wireless device and a second wireless device. In some examples, the block fading pattern may include a pattern of fluctuating channel quality. The code may include instructions executable by a processor to communicate with the second wireless device over the communication link based on one or more adjusted communications parameters. In some examples, the one or more communications parameters may be adjusted based on the determined block fading pattern.

Some examples of the method, apparatuses, and non-transitory computer-readable medium described herein may further include operations, features, means, or instructions for transmitting, to one or more other devices including at least the second wireless device, signaling that indicates one or more parameters associated with the block fading pattern. The one or more parameters may include a periodicity of the block fading pattern, a duration of the block fading pattern, an offset of the block fading pattern, a strength of the block fading pattern, a quality metric associated with the block fading pattern, or any combination thereof.

In some examples of the method, apparatuses, and non-transitory computer-readable medium described herein, transmitting the signaling may include operations, features, means, or instructions for transmitting the signaling via a sidelink communication link, an uplink communication link, a downlink communication link, a backhaul link, or any combination thereof, where each of the first wireless device and the second wireless device may be a UE, a base station, or a network node.

In some examples of the method, apparatuses, and non-transitory computer-readable medium described herein, the signaling includes radio resource control (RRC) signaling, downlink control information (DCI), sidelink control information (SCI), uplink control information (UCI), a medium access control-control element (MAC-CE), or any combination thereof, that conveys an indication of the one or more parameters associated with the block fading pattern.

In some examples of the method, apparatuses, and non-transitory computer-readable medium described herein, determining the block fading pattern may include operations, features, means, or instructions for receiving one or more signals from the second wireless device over the communication link. In some examples, determining the block fading pattern may include determining the block fading pattern based on measurements of the one or more signals received from the second wireless device.

In some examples of the method, apparatuses, and non-transitory computer-readable medium described herein, determining the block fading pattern may include operations, features, means, or instructions for receiving a measurement report from at least one of the second wireless device or a third wireless device that indicates one or more parameters associated with the block fading pattern. The one or more parameters may include a periodicity of the block fading pattern, a duration of the block fading pattern, an offset of the block fading pattern, a strength of the block fading pattern, a quality metric associated with the block fading pattern, or any combination thereof. In some examples, determining the block fading pattern may include determining the block fading pattern based on the received measurement report and the one or more parameters.

In some examples of the method, apparatuses, and non-transitory computer-readable medium described herein, determining the block fading pattern may include operations, features, means, or instructions for transmitting one or more signals to the second wireless device over the communication link and receiving one or more feedback messages from the second wireless device in response to the transmitted one or more signals. The one or more feedback messages may include one or more parameters associated with the block fading pattern. The one or more parameters may include a periodicity of the block fading pattern, a duration of the block fading pattern, an offset of the block fading pattern, a strength of the block fading pattern, a quality metric associated with the block fading pattern, or any combination thereof. In some examples, determining the block fading pattern may include determining the block fading pattern based on the one or more feedback messages received from the second wireless device and the one or more parameters.

In some examples of the method, apparatuses, and non-transitory computer-readable medium described herein, determining the block fading pattern may include operations, features, means, or instructions for communicating with a third wireless device different from the second wireless device and determining the block fading pattern based on communicating with the third wireless device.

Some examples of the method, apparatuses, and non-transitory computer-readable medium described herein may include operations, features, means, or instructions for selectively adjusting a schedule of signals transmitted over the communication link.

Some examples of the method, apparatuses, and non-transitory computer-readable medium described herein may include operations, features, means, or instructions for selectively adjusting an allocation of reference signals transmitted from the first wireless device to the second wireless device.

Some examples of the method, apparatuses, and non-transitory computer-readable medium described herein may include operations, features, means, or instructions for selectively adjusting a beamforming configuration for the communication link between the first wireless device and the second wireless device.

Some examples of the method, apparatuses, and non-transitory computer-readable medium described herein may include operations, features, means, or instructions for selectively adjusting a set of beam directions, a beam sweeping pattern, a beam sweeping periodicity, a beam sweeping order, or any combination thereof.

Some examples of the method, apparatuses, and non-transitory computer-readable medium described herein may include operations, features, means, or instructions for selectively adjusting a link management configuration used by the first wireless device or the second wireless device for the communication link. In some examples, the link management configuration may include one or more of a set of link management parameters or a set of timers associated with determining a link failure of the communication link.

Some examples of the method, apparatuses, and non-transitory computer-readable medium described herein may include operations, features, means, or instructions for selectively adjusting one or more measurement parameters for measuring the communication link. In some examples, the one or more measurement parameters may include a filtering coefficient for beam measurements, a filtering coefficient for channel measurements, or any combination thereof.

Some examples of the method, apparatuses, and non-transitory computer-readable medium described herein may include operations, features, means, or instructions for selectively adjusting a resource configuration associated with the communication link. In some examples, the resource configuration may include a time division duplexing (TDD) configuration, a slot format configuration, or any combination thereof.

Some examples of the method, apparatuses, and non-transitory computer-readable medium described herein may further include operations, features, means, or instructions for identifying a subset of communication resources from a set of communication resources used for communicating with the second wireless device that may be affected by the block fading pattern on the communication link and releasing the identified subset of communication resources for use by one or more other wireless devices associated with the first wireless device.

In some examples of the method, apparatuses, and non-transitory computer-readable medium described herein, releasing the identified subset of communication resources may include operations, features, means, or instructions for releasing the subset of communication resources for use by an integrated access and backhaul (IAB) node associated with the first wireless device.

Some examples of the method, apparatuses, and non-transitory computer-readable medium described herein may further include operations, features, means, or instructions for generating a feedback report indicating a state of the communication link based on the determined block fading pattern and transmitting the feedback report to one or more nodes. In some examples, the one or more nodes include the second wireless device, a central unit (CU), a parent IAB node, a neighboring node, or any combination thereof.

Some examples of the method, apparatuses, and non-transitory computer-readable medium described herein may further include operations, features, means, or instructions for selectively adjusting a channel estimation procedure, an interference cancellation procedure, synchronization parameters, a receiver algorithm, or any combination thereof.

Some examples of the method, apparatuses, and non-transitory computer-readable medium described herein may further include operations, features, means, or instructions for transmitting a signal to the second wireless device based on detecting the block fading pattern. In some examples, the signal may include an indication for the second wireless device to adjust one or more characteristics associated with the communication link.

In some examples of the method, apparatuses, and non-transitory computer-readable medium described herein, the indication may include a request for the second wireless device to refrain from transmitting signals to the first wireless device during one or more time periods corresponding to the determined block fading pattern.

In some examples of the method, apparatuses, and non-transitory computer-readable medium described herein, transmitting the signal to the second wireless device may include operations, features, means, or instructions for generating a measurement report based on measuring one or more signals received over the communication link and transmitting, to the second wireless device, the measurement report including an indication of the determined block fading pattern.

In some examples of the method, apparatuses, and non-transitory computer-readable medium described herein, determining the block fading pattern may include operations, features, means, or instructions for transmitting one or more signals to the second wireless device via a set of multiple beams based on a periodic beam transmission pattern. In some examples of the method, apparatuses, and non-transitory computer-readable medium described herein, determining the block fading pattern may include operations, features, means, or instructions for determining the block fading pattern based on the periodic beam transmission pattern. In some examples, the block fading pattern includes a periodic block fading pattern in accordance with the periodic beam transmission pattern.

In some examples of the method, apparatuses, and non-transitory computer-readable medium described herein, determining the block fading pattern may include operations, features, means, or instructions for communicating with the second wireless device via a relay device that relays communications between the first wireless device and the second wireless device and determining the block fading pattern based on the communications relayed by the relay device over the communication link.

In some examples of the method, apparatuses, and non-transitory computer-readable medium described herein, determining the block fading pattern may include operations, features, means, or instructions for communicating with the second wireless device based on a resource allocation scheme and determining the block fading pattern based on the resource allocation scheme.

DETAILED DESCRIPTION

Figure 1:
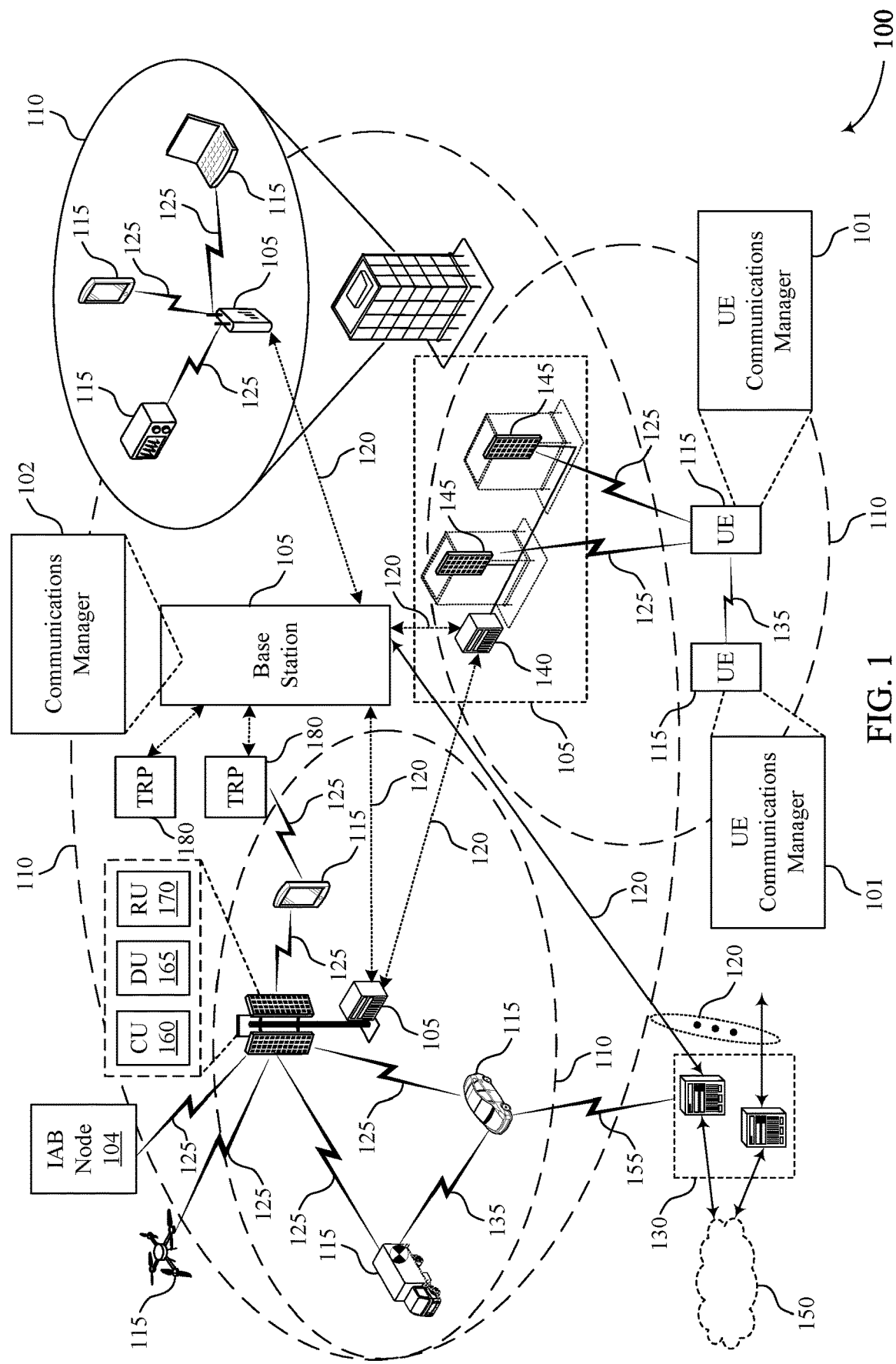
FIG. 1 illustrates an example of a wireless communications system that supports estimation and utilization of a block fading wireless channel in accordance with one or more aspects of the present disclosure.

In wireless communications systems, wireless signals may be blocked, diffracted, or redirected as they propagate from a transmitting device to a receiving device. The movement of the transmitting device and/or the receiving device relative to one another may further result in physical changes to the wireless signals. These environmental changes affecting the wireless signals may result in constructive/destructive interference, multi-path propagation issues, and fading. One such example of fading which may affect wireless signals is block fading. Fading may be defined as a variation in the attenuation of a wireless signal transmitted over a wireless channel, which may be caused by multipath propagation of the wireless signal and resulting in a superposition of multiple versions of the wireless signal at a receiver. The received signal may therefore be affected by constructive and/or destructive interference from the super-imposed versions of the signal. Block fading refers more specifically to fading that is approximately constant for some time duration (e.g., a number of symbols). As an example, a wireless signal may be attenuated to a first level for a first time period and the wireless signal may be attenuated to a second level different from the first level (or may not be attenuated) for a second time period following the first time period. Block fading may correspond to a change in propagation of signals via the wireless channel due to one or more parameters or conditions associated with the wireless channel, the signals being transmitted via the wireless channel, or both.

Block fading may be attributable to a number of sources including a periodic beam transmission pattern, the existence of relay communications devices, a periodic resource allocation scheme, and the like. A block fading pattern may be characterized by a periodic, quasi-periodic, or aperiodic pattern of fluctuating channel quality. If the channel quality fluctuates periodically, the block fading pattern may be referred to as a periodic block fading pattern. In order to achieve efficient and reliable wireless communications, some techniques may provide for estimation and compensation of variations within the wireless channel, including block fading. However, some techniques are unable to accurately and efficiently identify, estimate, and compensate for block fading patterns.

In order to achieve efficient and reliable wireless communications, it may be desirable to estimate and compensate for variations within the wireless channel, including block fading. As described herein, to address issues associated with block fading, a wireless device (e.g., UE, base station, a scheduling device, a scheduled device) may determine a block fading pattern associated with a communication link with another wireless device. The communication link may be a wireless link or channel that conveys data or control information between the wireless devices, such as an access link. The communication link may be a uni-directional or bi-directional communication link that conveys sidelink information, uplink information, downlink information, or any combination thereof. The block fading pattern may be identified or determined by measuring reference signals, based on an indication of the block fading pattern received via a measurement report or a feedback message from other wireless devices, based on monitoring for the block fading pattern, and the like. For example, a scheduling device, which may schedule or otherwise initiate communications performed by one or more other devices via a wireless channel, may identify a block fading pattern based on an allocation of reference signals or a periodic beam transmission pattern used by the scheduling device. By way of another example, a scheduled device (e.g., a device that receives control information that schedules a transmission by the device) may identify a block fading pattern by measuring reference signals or receiving a measurement report. In some examples, a wireless device (e.g., a UE, a base station, a scheduling device, a scheduled device) may detect or identify a block fading pattern and transmit signaling that indicates one or more parameters associated with the block fading pattern to one or more other wireless devices or nodes. The one or more parameters may include a periodicity, a duration, an offset, a strength, a quality metric, or any combination thereof associated with the block fading pattern. The other wireless devices may use the one or more parameters indicated via the signaling to determine the block fading pattern.

After identifying the block fading pattern, the wireless device may selectively adjust communications parameters (e.g., a schedule of communications, a beamforming configuration, a reference signal allocation, a link management configuration, or other communications parameters) for communicating over the communication link to mitigate the effects of the block fading pattern. For example, the wireless device may adjust a schedule of communications transmitted over the communication link in order to prevent signals from being transmitted over the communication link during intervals when the communication link exhibits relatively poor channel quality due to the block fading pattern. In another example, the wireless device may adjust a beamforming configuration, a reference signal allocation, or a link management configuration in order to address the determined block fading pattern. As noted previously herein, scheduling devices and/or scheduled devices may selectively adjust communications parameters in order to address block fading issues.

Subsequently, the wireless device may communicate over the communication link using the adjusted communications parameters. Additionally, the wireless device may generate a feedback report indicating the state of the communication link based on the block fading pattern, and transmit the feedback report to one or more nodes within the wireless communications system. Such techniques may enable wireless devices within the wireless communications system to detect and compensate for block fading, and maintain reliable wireless communications even in the presence of block fading patterns.

The techniques described herein may be employed by wireless devices to provide enhancements to wireless communications carried out in the presence of block fading. In particular, the techniques described herein may reduce or eliminate the effects of block fading, resulting in more efficient and reliable wireless communications, thereby increasing data rates and link capacity. In some aspects, techniques of the present disclosure may be performed by scheduling devices (e.g., devices that schedule communications resources for another device or for itself) and/or scheduled devices (e.g., devices that receive resource assignments from other devices for wireless communications). In some examples, identifying a block fading pattern and selectively adjusting communications parameters to address the block fading pattern may support improvements to power consumption, spectral efficiency, and, in some examples, may promote enhanced efficiency for wireless communications operations, among other features.

Aspects of the disclosure are initially described in the context of wireless communications systems. Aspects of the disclosure are additionally illustrated and described with reference to block fading diagrams and process flows. Aspects of the disclosure are further illustrated by and described with reference to apparatus diagrams, system diagrams, and flowcharts that relate to estimation and utilization of a block fading wireless channel.

FIG. 1 illustrates an example of a wireless communications system 100 that supports estimation and utilization of a block fading wireless channel in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low-latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

In some examples, one or more components of the wireless communications system 100 may operate as or be referred to as a network node. As used herein, a network node may refer to any UE 115, base station 105, a relay node, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. The base stations 105 may include or be associated with a set of transmission/reception points (TRPs) 180. The one or more base stations 105 may include a communications manager 102 configured to transmit signals to a UE 115 and communicate with the UE using one or more TRPs 180 of the set of TRPs 180.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and base stations 105. In such cases, the disaggregated UE 115 may include the respective physical devices configured to perform various functions and communications, for example to perform one or more of the estimation and utilization of a block fading pattern as described herein.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. The UEs 115 may each include a communications manager 101, which may receive one or more signals and communicate with a base station 105, one or more TRPs 180 of a set of TRPs 180 associated with a base station 105, or some other network node.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs 180. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent trans-mission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

Techniques described herein, in addition to or as an alternative to be carried out between UEs 115 and base stations 105 (which may be referred to as or be a part of network nodes), may be implemented via additional or alternative wireless devices, including IAB nodes 104, distributed units (DUs) 165, CUs 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the distributed unit (DU) 165, and the radio unit (RU) 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more network nodes may include CUs 160, DUs 165, and RUs 170 and may be referred to as donor network nodes or IAB donors. One or more DUs 165 (e.g., and/or RUs 170) associated with a donor network node may be partially controlled by CUs 160 associated with the donor network node. The one or more donor network nodes (e.g., IAB donors) may be in communication with one or more additional network nodes (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to perform one or more of the estimation and utilization of a block fading wireless channel as described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of network nodes. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP) functionality and signaling. The at least one DU 165 and/or RU 170 may host lower layer, such as layer 1 (L1) and layer 2 (L2) (e.g., RLC, MAC, physical (PHY)) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to perform one or more techniques for estimation and utilization of a block fading wireless channel as described herein.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support determination of a block fading pattern such that effects of block fading may be addressed (e.g., mitigated, modified, minimized). For example, a UE 115 and/or base station 105 of the wireless communications system 100 may identify (e.g., may be configured to identify) a block fading pattern associated with a communication link between the UE 115 and the base station 105. In this example, the UE 115 and/or the base station 105 may adjust (e.g., modify, alter, change, adapt) one or more communications parameters for communicating over the communication link based on the block fading pattern. For instance, the base station 105 may adjust a schedule of communications transmitted over the communication link in order to prevent signals from being transmitted over the communication link during intervals when the communication link exhibits poor channel quality due to the block fading pattern. In another example, the UE 115 and/or the base station 105 may adjust a beamforming configuration, a reference signal allocation, or a link management configuration in order to address the determined block fading pattern.

Continuing with the same example, the UE 115 and/or the base station 105 may communicate via the communication link based on the adjusted communications parameters. Such techniques may enable the UE 115 and/or the base station 105 of the wireless communications system 100 to mitigate the effects of block fading, and maintain reliable wireless communications even in the presence of block fading patterns.

Figure 2:
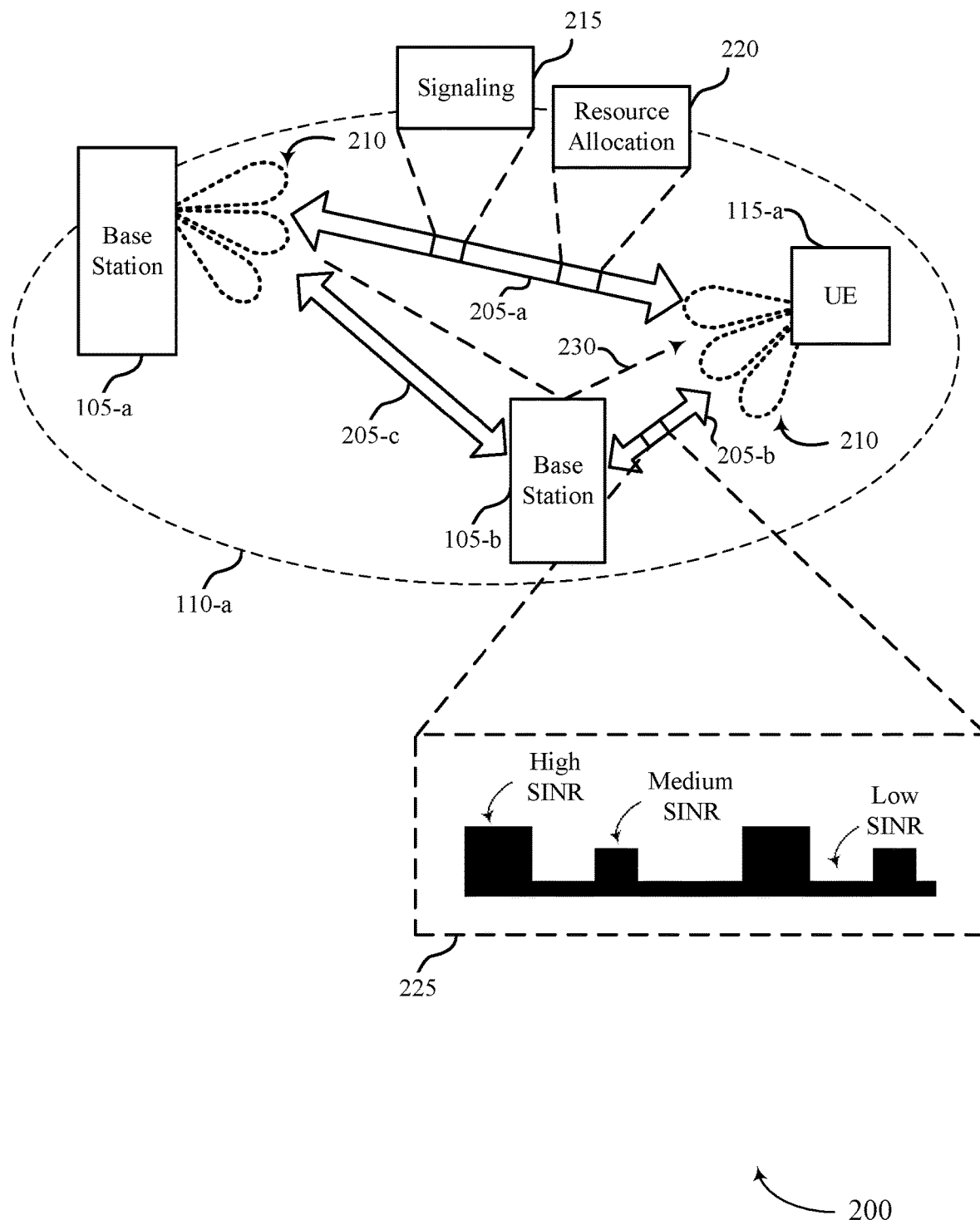
FIG. 2 illustrates an example of a wireless communications system that supports estimation and utilization of a block fading wireless channel in accordance with one or more aspects of the present disclosure.

FIG. 2 illustrates an example of a wireless communications system 200 that supports estimation and utilization of a block fading wireless channel in accordance with one or more aspects of the present disclosure. In some examples, the wireless communications system 200 may implement aspects of the wireless communications system 100. For example, the wireless communications system 200 may include a base stations 105-a and base station 105-b and a UE 115-a, which may be examples of base stations 105 and a UE 115 as described with reference to FIG. 1.

The base station 105-a, the base station 105-b, the UE 115-a, or any combination thereof may support beamformed communications using a respective set of beams 210. For example, each of the wireless devices in the wireless communications system 200 may include a respective set of beams 210 and may transition or sweep between the set of beams 210 to dynamically select a beam to use for communication.

In some aspects, the UE 115-a and the base stations 105-a, 105-b of the wireless communications system 200 may support communications for determining and addressing block fading patterns. For example, the UE 115-a and/or the base station 105-a may determine a block fading pattern associated with communications over a communication link 205 (e.g., communication link 205-a) between the UE 115-a and the base station 105-a. Subsequently, the UE 115-a and/or the base station 105-a may selectively adjust one or more communications parameters for communicating over the communication link based on the block fading pattern, and may thereby communicate over the communication link based on the one or more adjusted communications parameters.

The base station 105-a may support communications within a geographic coverage area 110-a. In some aspects, the UE 115-a may communicate with the base station 105-a via a communication link 205-a, which may be an example of an NR link between the UE 115-a and the base station 105-a. Similarly, the UE 115-a may communicate with the base station 105-b via a communication link 205-b, which may be an example of an NR link between the UE 115-a and the base station 105-b. In some cases, the communication links 205-a and 205-b may include examples of an access link (e.g., a Uu link). The communication links 205-a, 205-b may include bi-directional links that include both uplink and downlink. For example, the UE 115-a may transmit uplink signals, such as uplink control signals or uplink data signals, to the first base station 105-a using the first communication link 205-a and the first base station 105-a may transmit downlink signals, such as downlink control signals or downlink data signals, to the UE 115-a using the communication link 205-a. The UE 115-a may similarly transmit uplink signals to, and receive downlink signals from, the base station 105-b via communication link 205-b.

In some aspects, base station 105-a and the base station 105-b may communicate with one another via a communication link 205-c. In some cases, the communication link 205-c may include an example of a link between two base stations (e.g., a backhaul link such as an Xn link). The first base station 105-a and the second base station 105-b may, in some cases, be collocated. The communication link 205-c may include a bi-directional link.

In some aspects, the UE 115-a and/or the base stations 105-a, 105-b may support communications which enable estimation and utilization of block fading. As noted previously herein, block fading may correspond to a change in propagation of a signal via a wireless channel, such as any of the communication links 205-a, 205-b, and 205-c. A block fading pattern 225 may be characterized by a periodic, quasi-periodic, or aperiodic pattern of fluctuating channel quality (e.g., signal-to-interference-plus-noise ratio (SINR), or some other type of channel quality metrics), as illustrated by the example block fading pattern 225 in FIG. 2, and described in further detail with reference to FIG. 3. In some cases, the block fading pattern may correspond to a pattern of fading that affects (e.g., attenuates, interferes with) a signal during respective time durations. Block fading may occur on any one or more of the communication links 205-a, 205-b, and 205-c, as well as other communications links 205 between other wireless devices not pictured in FIG. 2. Moreover, block fading may be attributable to a number of different sources or scenarios.

For example, in some aspects, block fading may be attributable to transmission characteristics of a scheduling device. For instance, when transmitting downlink signals to the UE 115-a via communication link 205-a, the base station 105-a may utilize multiple beam/precoding candidates and may follow a periodic beam transmission pattern in which the base station 105-a switches or alternates between different beam candidates of a set of beams 210 for transmissions to the UE 115-a (e.g., using a beam sweeping pattern). Additionally or alternatively, the base station 105-a may be able to communicate within a subset of time-domain resources in accordance with a resource allocation scheme or scheduling scheme. In these examples, the transmission characteristics of the base station 105-a may result in a block fading pattern 225, and the base station 105-b may be aware of the cause of the block fading pattern 225. However, due to the fact that the block fading pattern 225 results from the transmission characteristics at the base station 105-a, the UE 115-a may not be aware of the underlying cause of a block fading pattern 225.

By way of another example, a block fading pattern 225 may result from signals being reflected and/or repeated by a third device, such as a relay device (e.g., a repeater). For instance, in some aspects, an additional device (such as the base station 105-b or another device) may serve as a relay device configured to relay communications from the first base station 105-a to the UE 115-a. In this example, the base station 105-a may transmit signals to the base station 105-b via communication link 205-c, and the base station 105-b (e.g., relay device) may relay the signals to the UE 115-a via the communication link 205-b. Additionally, or alternatively, the signals may be reflected off of the base station 105-b and re-directed toward the UE 115-a, as shown by the reflection path 230. In some other examples, signal may be reflected via one or more other reflection paths by some other objects, such as buildings or other physical structures. In these and other examples, the relay or reflection of transmissions/ signals may result in a periodic change in the propagation of the signals, thereby resulting in a block fading pattern 225. More specifically, the presence of other objects (e.g., reflectors) and/or other devices (e.g., the base station 105-*b* that relays a signal) in the environment surrounding a transmitter and receiver may create multiple paths that a transmitted signal may traverse. Thus, when the transmitted signal is reflected and/or repeated, the multiple, different paths of the signal may result in a superposition of multiple versions of the signal a receiver. Further, each version of the signal may experience varying attenuation, delay, or phase shift, for example, based on the path that a respective signal traversed, which may result in constructive and/or destructive interference, thereby modifying the power of the signal at the receiver (e.g., a SINR of the signal may vary based on the multi-path propagation of the signal). These effects may result in the block fading pattern 225. In some cases, the base station 105-*a* and/or the UE 115-*a* may not be aware of the existence of the relay device/repeater (e.g., base station 105-*b*) and may therefore be unaware of the cause of the block fading pattern 225.

In another example, signals transmitted from the base station 105-*a* to the UE 115-*a* via the communication link 205-*a* may be at least partially blocked/reflected by an object that demonstrates a periodic or quasi-periodic behavior. For example, a windmill or robotic arm of a factory may exhibit a periodic movement pattern which periodically or quasi-periodically blocks signals transmitted from the base station 105-*a* to the UE 115-*a*, and thereby results in a block fading pattern 225. Similarly, periodic or quasi-periodic, bursty interference associated with other communications/signals proximate to the communication link 205-*a* may also result in a block fading pattern 225.

Accordingly, in order to address the issues associated with potential sources of block fading patterns 225 illustrated above, the wireless communications system 200 may support communications which enable estimation and utilization of block fading. For example, in some aspects, the base station 105-*a* and/or UE 115-*a* may determine a block fading pattern 225 associated with the communication link 205-*a* between the base station 105-*a* and the UE 115-*a*.

The base station 105-*a* and/or the UE 115-*a* may determine or identify the block fading pattern 225 by monitoring communications via the communication link 205-*a* for the block fading pattern 225, based on an indication received via signaling 215 from another wireless device, or both. For example, if a wireless device, such as the base station 105-*a* and/or the UE 115-*a* identifies the block fading pattern 225 (e.g., has obtained one or more metrics that describe the block fading pattern 225 and/or the properties of the block fading pattern 225), the wireless device may transmit signaling 215 to one or more other wireless devices that indicates one or more parameters associated with the block fading pattern 225. The one or more parameters may include a periodicity of the block fading pattern 225, a duration of the block fading pattern 225, an offset of the block fading pattern 225, a strength of the block fading pattern 225, a quality metric associated with the block fading pattern 225, or any combination thereof.

The signaling may be transmitted via a communication link 205 (e.g., an uplink or downlink communication link), via a backhaul link (e.g., the communication link 205-*c* or some other backhaul link between network nodes), or via a sidelink communication link (e.g., a sidelink communication link 135 described with reference to FIG. 1) based on a type of the wireless device. For example, the wireless device that identifies the block fading pattern 225 may be a base station 105, a UE 115, a network node, a repeater or relay device, or any combination thereof. The signaling 215 may be transmitted via RRC signaling, a MAC-CE, UCI, DCI, SCI, or any combination thereof, and may include one or more fields or information elements configured to indicate the one or more parameters associated with the block fading pattern 225. The signaling 215 may, in some examples, represent an example of a measurement report, a feedback report, or a feedback message.

In response to (e.g., subsequent to) determining the block fading pattern 225, the base station 105-*a* and/or the UE 115-*a* may then adjust (e.g., selectively adjust) one or more communications parameters for communicating with the other respective device (e.g., base station 105-*a* or UE 115-*a*) over the communication link 205-*a* based on the determined block fading pattern 225. Subsequently, the base station 105-*a* and/or the UE 115-*a* may communicate with the other respective device (e.g., base station 105-*a* or UE 115-*a*) over the communication link 205-*a* based on the one or more adjusted communications parameters. In some examples, adjusting the one or more communications parameters may include adjusting a resource allocation 220 associated with a respective communication link 205. For example, the resource allocation 220 may correspond to a configuration, an allocation, or a schedule of resources for reference signal transmissions or other communications via the communication link 205. Other examples of adjusting the one or more communications parameters are described in further detail with reference to FIGS. 3-5.

By identifying and adapting communications parameters based on the existence of a block fading pattern 225, aspects of the present disclosure may enable more efficient and reliable wireless communications even in the presence of the block fading pattern 225.

Figure 3:
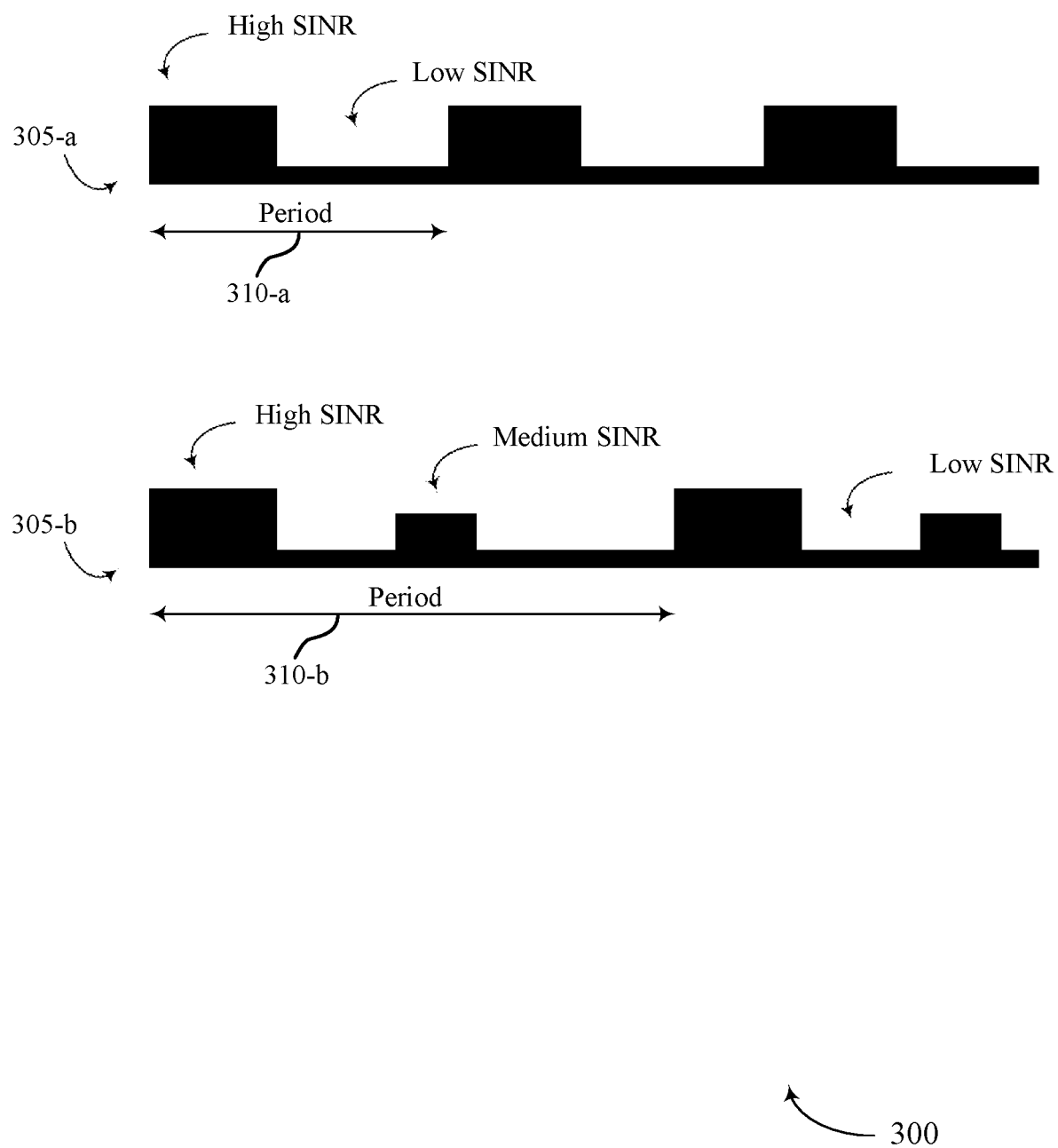
FIG. 3 illustrates an example of a block fading diagram that supports estimation and utilization of a block fading wireless channel in accordance with one or more aspects of the present disclosure.

FIG. 3 illustrates an example of a block fading diagram 300 that supports estimation and utilization of a block fading wireless channel in accordance with one or more aspects of the present disclosure. In some examples, the block fading diagram 300 may illustrate aspects of wireless communications system 100 or 200. The block fading diagram 300 may illustrate examples of block fading patterns associated with a communication link between two or more wireless devices. More specifically, block fading diagram 300 illustrates a first block fading pattern 305-*a* and a second block fading pattern 305-*b*, which may represent examples of a block fading pattern 225 described with reference to FIG. 2. For example, the block fading patterns 305-*a* and 305-*b* illustrate example patterns of fluctuating channel quality over a wireless channel, which may be an example of any one or more of the wireless communication links 205-*a*, 205-*b*, and 205-*c* described with reference to FIG. 2.

As noted previously herein, a block fading pattern may be characterized by a periodic pattern of fluctuating channel quality. Fluctuating channel quality may be determined according to any characteristic known in the art including, but not limited to, a SINR, a signal-to-noise ratio (SNR), a received signal strength indicator (RSSI) value, and the like. For example, as shown in the block fading diagram 300, the first block fading pattern 305-*a* may be characterized by a periodic pattern of fluctuating SINR. More particularly, the first block fading pattern 305-*a* may be characterized by time intervals of relatively high SINR followed by time intervals of relatively low SINR. By way of another example, the second block fading pattern 305-*b* may be characterized by time intervals of relatively high SINR followed by time intervals of relatively low SINR followed by time intervals of medium SINR (e.g., some SINR value that is in between the relatively high SINR and relatively low SINR). In some aspects, a magnitude of the SINR may correspond to a strength of the block fading pattern 305.

In some aspects, the block fading patterns 305-a, 305-b may be defined by a periodicity. The periodicity of a block fading pattern 305-a, 305-b may define a time interval over which the block fading pattern 305-a, 305-b exhibits fluctuating channel quality (e.g., SINR). That is, it may be determined that the fluctuating channel quality has periodic behavior. In such cases, the block fading patterns 305-a and 305-b may be referred to as periodic block fading patterns. For example, the block fading pattern 305-a may be characterized by a period 310-a, and the block fading pattern 305-b may be characterized by a period 310-b. The block fading patterns 305-a, 305-b may further be characterized by any number of characteristics known in the art. For example, the block fading patterns 305-a, 305-b may be characterized by time intervals/durations associated with good channel quality (e.g., high SINR), time intervals/durations associated with poor channel quality (e.g., relatively low SINR), a strength of each time interval/duration, an offset of the block fading pattern 305 (e.g., a starting time or position), a quality metric associated with the block fading pattern 305, and the like. Although the block fading patterns 305 are illustrated as periodic block fading patterns 305, it is to be understood that a block fading pattern 305 may follow any quasi-periodic or aperiodic pattern that may be characterized by the described characteristics or parameters.

In some aspects, a block fading pattern (e.g., block fading pattern 305-a, 305-b) may exhibit a sinusoidal block fading pattern. Such an undulating, sinusoidal block fading pattern may result from environmental factors which result in partial reflection or blocking of signals over a communication link, rather than complete reflection or blocking.

The block fading patterns 305-a, 305-b may be attributable to a number of different sources including, but not limited to, a periodic or aperiodic beam transmission pattern, the existence of relay communications devices, a periodic or aperiodic resource allocation scheme, and the like. Accordingly, aspects of the present disclosure may be directed to a system and method for determining a block fading pattern 305 (e.g., block fading patterns 305-a, 305-b) associated with a communication link, selectively adjusting communications parameters based on the identified block fading pattern 305, and communicating over the communication link using the adjusted communications parameters. For example, as described herein, a device (e.g., a UE 115, base station 105, a scheduling device, a scheduled device, or the like) may attempt to estimate or track a block fading pattern 305. The tracking and/or estimation of the block fading pattern 305 may be based on one or more of the device's own measurements (e.g., uplink or downlink measurements), a received feedback message from another device or node, or a measurement report from the other device or node. In other cases, the tracking and/or estimation of the block fading pattern 305 may be based on determining and providing measurement configurations (various reference signals may be configured in the time domain to probe a channel or communication link to identify the block fading pattern 305).

The device (e.g., a UE, a base station, a scheduled device, or a scheduling device) may attempt to estimate or track the block fading pattern 305 by estimating one or more parameters associated with a block fading pattern 305. The parameters may include one or more periodicities, one or more durations (e.g., ON durations, OFF durations), a strength of the block fading pattern 305 during each duration, one or more offsets, one or more quality metrics, or any combination thereof associated with the block fading pattern 305. In some aspects, a block fading pattern 305 may include or be associated with one or more states, such as an ON state or an OFF state associated with channel fluctuations. Each state may be associated with a respective periodicity, duration, offset, or any combination thereof, and the one or more parameters associated with a block fading pattern 305 may include a combination of respective parameters for each state of the block fading pattern 305. A wireless device may thus estimate and characterize a block fading patterns 305 based on the one or more parameters associated with states of the block fading pattern 305.

In some aspects, the device may transmit signaling to one or more other devices or nodes to indicate the one or more parameters associated with the block fading pattern 305. The signaling may be RRC signaling, a MAC-CE, DCI, UCI, SCI, or some other control signaling, and may represent an example of the signaling 215 described with reference to FIG. 2. The signaling may include one or more information elements configured to convey the one or more parameters. In some examples, the signaling may be a measurement report, a feedback report, or a feedback message. The one or more other devices may receive the signaling and infer the block fading pattern 305 based on the one or more parameters.

Upon gathering the information associated with the block fading pattern 305, the device (e.g., a UE, a base station, a scheduled device, or a scheduling device) may modify or adjust various communications parameters used for communicating with one or more other devices. In particular, and as described in further detail herein, scheduling, resource/beam allocation, reference signal allocation, and beam sweeping patterns may be modified or adjusted based on the block fading periodicity exhibited by an identified block fading pattern 305 (e.g., block fading patterns 305-a, 305-b). In addition, the device may select various parameters and timers associated with beam failure or link failure, where the parameters may prevent the declaration of beam or link failure too early (e.g., in cases where decreased link quality may be accounted for through adjustments based on the block fading pattern 305). The device may also use aspects of the block fading pattern 305 to select various filtering coefficients (e.g., for beam and channel measurements), select TDD or slot configurations (e.g., including the dynamic or semi-static assignment of flexible resources), release resources to other devices, and provide feedback about the channel state (and the associated block fading parameters) to other devices or nodes. In yet further examples, based on one or more block fading patterns 305 that are identified, the device may optimize its channel estimation algorithm, estimate and minimize or cancel interferences, and adjust synchronization or beam management procedures.

Thus, one or more devices in a system may detect a block fading pattern 305 and estimate one or more parameters associated with the block fading pattern 305. The one or more devices may represent examples of any one of the UE 115-a, the base station 105-a, or the base station 105-b, as described with reference to FIG. 2. The one or more parameters may include one or more periodicities, durations, offsets, quality metrics, or any combination thereof associated with channel fluctuations of the block fading pattern. Based on one or more block fading patterns 305, a scheduling device (or serving node/device, such as the base station 105-a in FIG. 2) may perform functions to optimize various configurations and the scheduling of resources. In addition, a scheduled device (e.g., the UE 115-*a* in FIG. 2, or some other scheduled device) may optimize its receiver algorithms based on the adjustments made by the scheduling device, or based on the block fading pattern 305 itself.

Figure 4:
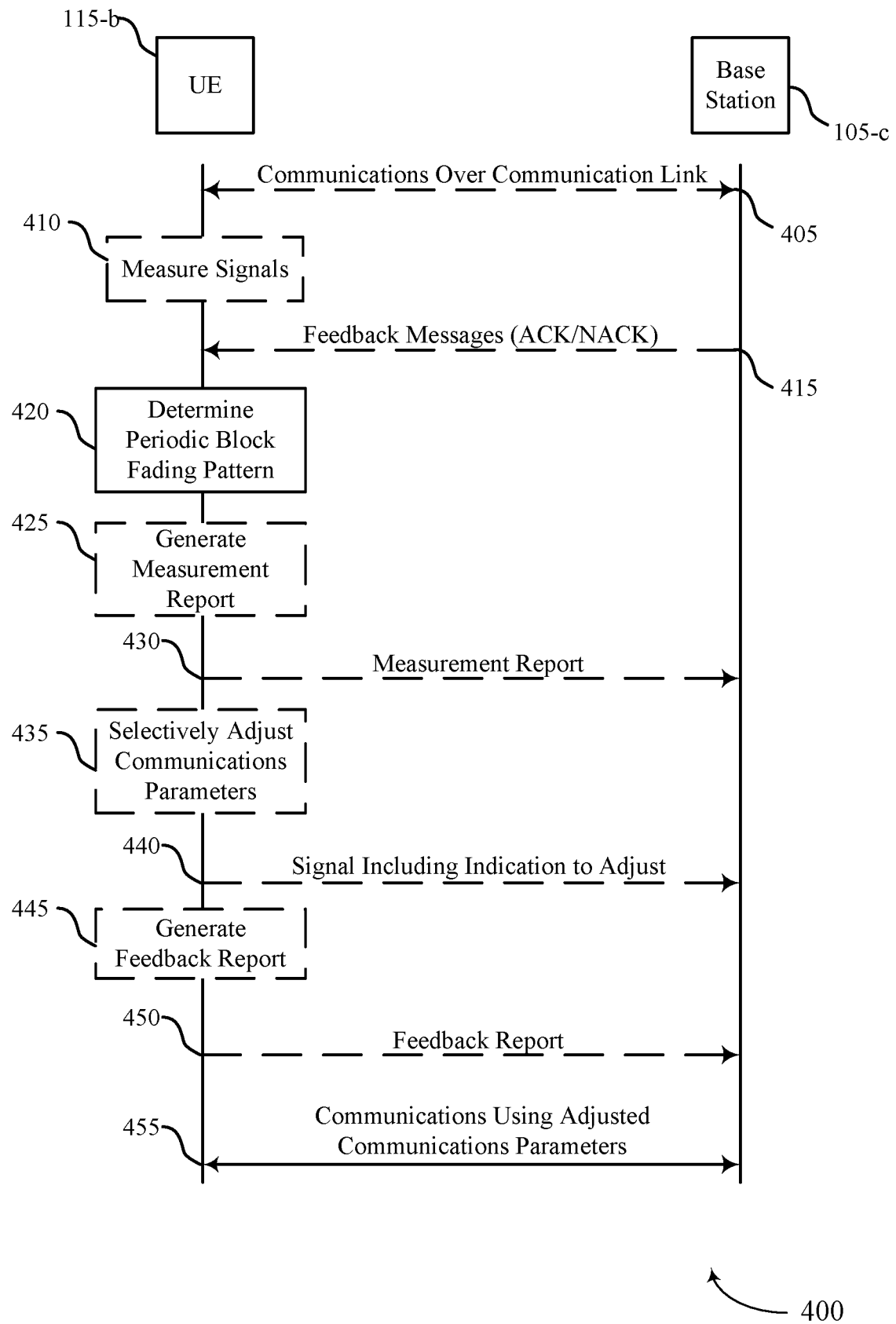
FIG. 4 illustrates an example of a process flow that supports estimation and utilization of a block fading wireless channel in accordance with one or more aspects of the present disclosure.

FIG. 4 illustrates an example of a process flow 400 that supports estimation and utilization of a block fading wireless channel in accordance with one or more aspects of the present disclosure. In some examples, process flow 400 may implement aspects of wireless communications system 100 or 200, and block fading diagram 300. For example, the process flow 400 may illustrate determining a block fading pattern, selectively adjusting communications parameters based on the block fading pattern, and communicating with a second device based on the adjusted communications parameters, as described with reference to FIGS. 1-3.

In some cases, process flow 400 may include a UE 115-*b* and a base station 105-*c* which may be examples of corresponding devices as described herein. In particular, the UE 115-*b* and the base station 105-*c* illustrated in FIG. 4 may be examples of the UE 115-*a* and the first base station 105-*a* illustrated in FIG. 2.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added. It is also noted that the operations in process flow 400 performed by UE 115-*b* and base station 105-*c* may be respectively performed by a UE 115, a base station 105, or another wireless device, and the example shown should not be construed as limiting. For instance, the operations shown as performed by UE 115-*b* may be performed by a base station 105, and the operations shown as performed by base station 105-*c* may be performed by a UE 115. As such, the UE 115-*b* and the base station 105-*c* may each operate as a scheduling device, a scheduled device, or both.

At 405, the UE 115-*b* and the base station 105-*c* may communicate with one another over a communication link. For example, the base station 105-*b* (e.g., scheduling device) may transmit downlink signals to the UE 115-*b* (e.g., scheduled device) over the communication link, and the UE 115-*b* may transmit uplink signals to the base station 105-*c* via the communication link.

At 410, the UE 115-*b* may measure signals received from the base station 105-*c* over the communication link. For example, the UE 115-*b* may measure downlink signals, such as reference signals received from the base station 105-*c* via the communication link.

At 415, the UE 115-*b* may receive one or more feedback messages from the base station 105-*c*. In some aspects, the base station 105-*c* may transmit the feedback messages based on signals received from the UE 115-*b*. In some aspects, the feedback messages may include acknowledgement (ACK) messages or negative-acknowledgement (NACK) messages responsive to one or more uplink transmissions (e.g., data) from the UE 115-*b*. Here, the base station 105-*c* may transmit feedback messages (e.g., ACK messages, NACK messages) in response to the signals received from the UE 115-*b*. In this regard, the ACK/NACK messages received from the base station 105-*c* may provide an indication of the channel quality. In some aspects (such as when the UE 115-*b* is operating as a scheduling device), the UE 115-*b* may transmit signals to "probe" a communication link for block fading. For instance, the UE 115-*b* may establish or increase a frequency of signals (e.g., uplink or downlink reference signals) transmitted to probe the communication link for block fading. In such cases, the signals may be spread in time or in frequency to efficiently probe the communication link (or corresponding channel).

At 420, the UE 115-*b* may determine a block fading pattern associated with the communication link between the UE 115-*b* and the base station 105-*c*. As noted previously herein, the block fading pattern may include a periodic pattern of fluctuating channel quality, as shown in FIG. 3. In some aspects, the UE 115-*b* may determine/identify one or more characteristics of the block fading pattern including, but not limited to, a periodicity (e.g., period 310-*a*, 310-*b*, as described with reference to FIG. 3, time intervals/durations of good channel quality, time intervals/durations of poor channel quality, and the like). The UE 115-*b* may determine the block fading pattern using any metrics known in the art including, but not limited to, SINR, SNR, RSSI, and the like.

The UE 115-*b* may determine the block fading pattern according to a number of various techniques. For example, the UE 115-*b* may determine the block fading pattern based on the measurement of the signals performed at 410. The UE 115-*b* may thus measure signals received from the base station 105-*c* at 410 (e.g., SINR measurements, SNR measurements), and may monitor for and determine the block fading pattern based on the measurements of the signals.

By way of another example, the UE 115-*b* may determine the block fading pattern based on the feedback messages received at 415. For instance, the UE 115-*b* may identify the block fading pattern based on the timing or frequency of feedback messages (e.g., ACK messages, NACK messages) received from the base station 105-*c* (or from another device). In this example, the received feedback messages may provide an indication of a level of channel quality, and the UE 115-*b* may determine the block fading pattern based on the received feedback messages.

In some aspects, the UE 115-*b* may determine the block fading pattern based on communications carried out with another wireless device. For example, the UE 115-*b* may communicate with a third wireless device different from the base station 105-*c* via a second communication link. The third wireless device may include another UE 115 or another base station 105. In this example, the UE 115-*b* may determine the block fading pattern associated with the communication link with the base station 105-*c* based on the communications with the third wireless device. For instance, in some cases, the UE 115-*b* may determine characteristics of the second communication link while communicating with the third wireless device, and may thereby determine the block fading pattern of the communication link with the base station 105-*c* based on the determined characteristics of the second communication link. Additionally or alternatively, the UE 115-*b* may determine the block fading pattern based on the frequency of reference signals transmitted over a communication link (e.g., as a result of "probing" the link and/or channel for block fading patterns).

In some aspects, the UE 115-*b* may determine the block fading pattern based on a measurement report received from another wireless device. The measurement report may include an indication of the block fading pattern. For example, the measurement report may include one or more parameters associated with the block fading pattern. The measurement report may, in some aspects, represent an example of the signaling 215 described with reference to FIG. 2. The one or more parameters may include a periodicity of the block fading pattern, a duration of the block fading pattern, an offset of the block fading pattern, a strength of the block fading pattern, a quality metric associated with the block fading pattern, or any combination thereof. In some aspects, the measurement report may be received from the base station 105-c and/or another wireless device (e.g., third wireless device).

In some aspects, the UE 115-b may determine the block fading pattern based on the existence of a relay device. For example, as described previously herein with respect to FIG. 2, another wireless device (e.g., base station 105-b illustrated in FIG. 2, another UE 115, and the like) may serve as a relay device (e.g., repeater) configured to relay communications between the UE 115-b and the base station 105-c illustrated in FIG. 4. In this example, the UE 115-b may communicate with the base station 105-c via the relay device, and determine the block fading pattern based on the communications relayed by the relay device over the communication link between the UE 115-b and the base station 105-c. As noted previously herein, a relay device may result in a periodic change in the propagation of the signals, thereby resulting in a block fading pattern. In this regard, by identifying that communications between the UE 115-b and the base station 105-c are relayed via the relay device, the UE 115-b may determine the block fading pattern based on communicating via the relay device.

At 425, the UE 115-c may optionally generate a measurement report. For example, the UE 115-b may measure signals received from the base station 105-c over the communication link, and may generate the measurement report based on the measurements performed. In this regard, the UE 115-b may generate the measurement report based on the measurements performed at 410. The measurement report may include measurements of any characteristic known in the art associated with the received signals and/or the determined block fading pattern. For example, the measurement report may include indications associated with channel quality of received signals (e.g., SINR, SNR, RSSI), an identified block fading pattern, characteristics of a block fading pattern (e.g., periodicity), and the like. In some aspects, the measurement report may include an indication of the one or more parameters associated with the block fading pattern, and may represent an example of the signaling 215 as described with reference to FIG. 2.

At 430, the UE 115-b may transmit the measurement report to the base station 105-c. For example, the UE 115-b may transmit the measurement report to the base station 105-c via the communication link. In some aspects, the measurement report may include indications of one or more parameters associated with the determined block fading pattern in order to inform the base station 105-c of the identified block fading pattern. The one or more parameters may include a periodicity of the block fading pattern, a duration of the block fading pattern, an offset of the block fading pattern, a strength of the block fading pattern, a quality metric associated with the block fading pattern, or any combination thereof. In some aspects, the UE 115-b may transmit the measurement report via RRC signaling, a MAC-CE, DCI, SCI, UCI, or any combination thereof. The UE 115-b may transmit the measurement report to the base station 105-c and/or one or more other wireless devices.

At 435, the UE 115-b may selectively adjust one or more communications parameters for communicating with the base station 105-c over the communication link. In some aspects, the UE 115-b may selectively adjust one or more communications parameters based on the determined block fading pattern.

The UE 115-b may selectively adjust the one or more communications parameters using a variety of techniques. For example, in some aspects, the UE 115-b may selectively adjust a beamforming configuration for transmitting and/or receiving signals to/from the base station 105-c via the communication link. For instance, the UE 115-b may selectively adjust a beam direction, a beam sweeping pattern, a beam sweeping periodicity, a beam sweeping order, or the like. In some examples, the UE 115-b may adjust its synchronization and beam management through modifications to techniques used for processing received signals (e.g., combining, selecting, applying receive beamforming) from the base station 105-c.

By way of another example, the UE 115-b may selectively adjust a link management configuration used by the UE 115-b and/or the base station 105-c. As it is used herein, the term "link management configuration" may be used to refer to a set of parameters or characteristics used by the UE 115-b and/or base station 105-c to determine a link failure of the communication link between the UE 115-b and another device. In this regard, the link management configuration may include a set of link management parameters or a set of timers which are used to determine a link failure of the communication link. For instance, the UE 115-b may selectively adjust a timer used to determine a link failure based on the block fading pattern in order to prevent the UE 115-b from unnecessarily determining a failure event of the communication link (e.g., when the UE 115-b is configured as a scheduling device). Similarly, the UE 115-b may selectively adjust the timer in order to reduce a frequency with which the UE 115-b determines link failure.

In some aspects, the UE 115-b may selectively adjust a schedule of signals transmitted by the UE 115-b to another device over the communication link based on the block fading pattern (such as when the UE 115-b is configured as a scheduling device). For example, the UE 115-b may identify one or more time periods over which the communication link exhibits relatively poor channel quality (e.g., relatively low SINR) based on the block fading pattern. In this example, the UE 115-b may selectively adjust a schedule of signals transmitted to another device such that the signals are not transmitted during the one or more time periods of the block fading pattern which exhibit poor channel quality. Thus, the transmissions by UE 115-b may occur when the channel or communication link is in a good state based on the periodicity of the block fading pattern.

In some aspects, the UE 115-b may selectively adjust one or more measurement parameters for measuring the communication link between the UE 115-b and another device. The UE 115-b may selectively adjust the one or more measurement parameters based on the determined block fading pattern. For example, the UE 115-b may selectively adjust measurement parameters including, but not limited to, a filtering coefficient for beam measurements, a filtering coefficient for channel measurements, or any combination thereof. Similarly, the UE 115-b may selectively adjust algorithms used for channel estimation, interference estimation, and the like. For example, the UE 115-b may selectively adjust a channel estimation procedure, an interference cancellation procedure, synchronization parameters, a receiver algorithm, or any combination thereof. In this regard, the UE 115-b may adjust characteristics of the UE 115-b itself in order to improve communications over the communication link.

At 440, the UE 115-b may optionally transmit a signal including an indication for the base station 105-c to adjust one or more characteristics/communications parameters associated with the communication link. In some aspects, the UE 115-*b* may transmit the indication for the base station 105-*c* to adjust one or more characteristics/communications parameters associated with the communication link based on the block fading pattern. In this regard, in addition to selectively adjusting communications parameters itself at 435, the UE 115-*b* may transmit signaling configured to cause the base station 105-*c* to additionally or alternatively adjust communications parameters.

For example, the UE 115-*b* may identify one or more time periods over which the communication link exhibits relatively poor channel quality (e.g., relatively low SINR) based on the block fading pattern. In this example, the signal transmitted by the UE 115-*b* at 440 may include an indication which includes a request for the base station 105-*c* to refrain from transmitting signals to the UE 115-*b* during the one or more time periods of the block fading pattern which exhibit poor channel quality.

At 445, the UE 115-*b* may optionally generate a feedback report. In some aspects, the UE 115-*b* may generate the feedback report based on the block fading pattern. The feedback report may include an indication of a state of the communication link between the UE 115-*b* and the base station 105-*c*. Additionally or alternatively, the feedback report may include an estimation of one or more block fading parameters (e.g., periodicity, ON duration, offset, etc.), or may include an explicit indication of one or more block fading patterns affecting the communication link.

At 450, the UE 115-*b* may transmit the feedback report to the base station 105-*c*. In some aspects, the UE 115-*b* may generate and transmit the feedback report to one or more other wireless devices (e.g., base station 105-*c*) in order to provide the network (e.g., wireless communications system 100, 200) with information regarding the identified block fading pattern. The feedback report may be transmitted to the base station 105-*c* and/or other wireless devices. For instance, the UE 115-*b* may additionally or alternatively transmit the feedback report to a third wireless device other than the base station 105-*c*, a central unit, a parent IAB node, a child IAB node, a neighboring node, and the like. The UE 115-*b* may transmit the feedback report via signaling, such as RRC signaling, UCI, DCI, SCI, a MAC-CE, or any combination thereof. The signaling may include one or more information elements configured to convey an indication of the one or more block fading parameters.

At 455, the UE 115-*b* may communicate with the base station 105-*c* using the one or more adjusted communications parameters. For example, in cases where the UE 115-*b* selectively adjusts beamforming characteristics used by the UE 115-*b* at 435, the UE 115-*b* may then use the adjusted beamforming characteristics when communicating with the base station 105-*b* via the communication link at 455. By way of another example, in cases where the UE 115-*b* selectively adjusts measurement parameters for measuring the communication link at 435, the UE 115-*b* may then use the adjusted measurement parameters for measuring the communication link at 455.

In some aspects, FIG. 4 is shown and described as including the UE 115-*b* carrying out particular steps/functions of process flow 400. However, any processing shown as being carried out by the UE 115-*b* may additionally and/or alternatively be carried out by the base station 105-*c*, unless noted otherwise herein. For example, the base station 105-*c* may determine the block fading pattern at 420, generate/transmit the measurement report at 425, and 430, selectively adjust communications parameters at 435, and the like.

Figure 5:
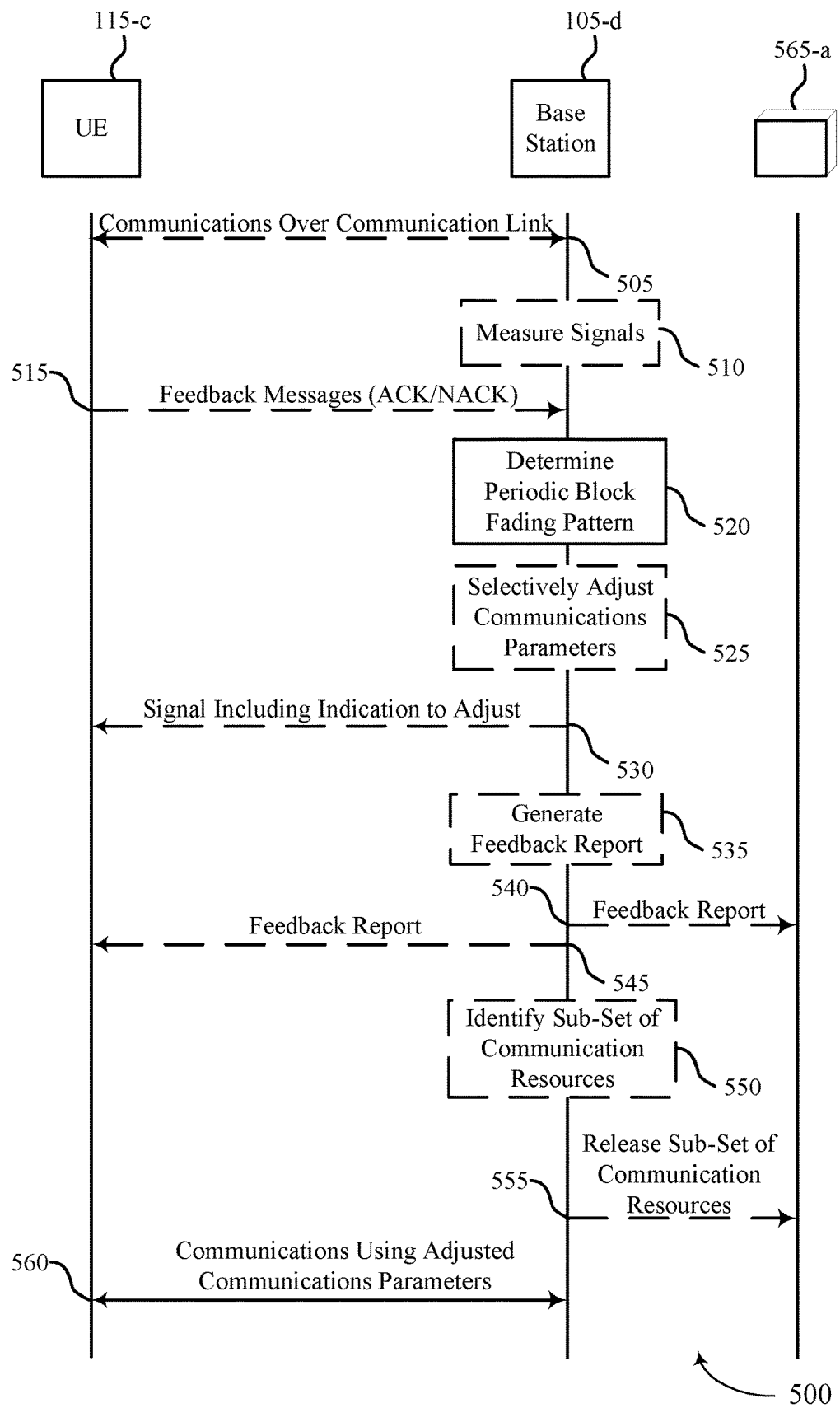
FIG. 5 illustrates an example of a process flow that supports estimation and utilization of a block fading wireless channel in accordance with one or more aspects of the present disclosure.

FIG. 5 illustrates an example of a process flow 500 that supports estimation and utilization of a block fading wireless channel in accordance with one or more aspects of the present disclosure. In some examples, process flow 500 may implement aspects of wireless communications system 100 or 200, block fading diagram 300, and process flow 400. For example, the process flow 500 may illustrate determining a block fading pattern, selectively adjusting communications parameters based on the block fading pattern, and communicating with a second device based on the adjusted communications parameters, as described with reference to FIGS. 1-4.

In some cases, process flow 500 may include a UE 115-*c*, a base station 105-*d*, and a wireless device 565-*a*, which may be examples of corresponding devices as described herein. In particular, the UE 115-*c* and the base station 105-*d* illustrated in FIG. 5 may be examples of the UE 115-*a* and the first base station 105-*a* illustrated in FIG. 2. In some aspects, the wireless device 565-*a* may be an example of a node of a wireless communications system (e.g., wireless communications system 100, 200) which is communicatively coupled to (e.g., associated with) the base station 105-*d*. For example, the wireless device 565-*a* may include an IAB node or a neighboring node communicatively coupled to the base station 105-*d*. In other cases, wireless device 565-*a* may be an example of a network node or network entity that provides, for example, scheduling or resource allocation functionality in a system.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added. In addition, the operations in process flow 500 performed by UE 115-*c*, base station 105-*d*, and wireless device 565-*a*, may be respectively performed by a UE 115, a base station 105, or another wireless device, and the examples shown should not be construed as limiting. For instance, the operations shown as performed by UE 115-*c* may be performed by a base station 105, and the operations shown as performed by base station 105-*d* may be performed by a UE 115. As such, the UE 115-*b* and the base station 105-*c* may each operate as a scheduling device, a scheduled device, or both.

At 505, the UE 115-*c* and the base station 105-*d* may communicate with one another over a communication link. For example, the base station 105-*d* (e.g., scheduling device) may transmit downlink signals to the UE 115-*c* (e.g., scheduled device) over the communication link, and the UE 115-*c* may transmit uplink signals to the base station 105-*d* via the communication link.

At 510, the base station 105-*d* may measure signals received from the UE 115-*c* over the communication link. For example, the base station 105-*d* may measure uplink signals received from the UE 115-*c* via the communication link.

At 515, the base station 105-*d* may receive one or more feedback messages from the UE 115-*c*. In some aspects, the UE 115-*c* may transmit the feedback messages based at least in response to signals received from the base station 105-*d*. For example, in some aspects, the base station 105-*d* may transmit signals (e.g., reference signals) to the UE 115-*c* over the communication link in order to "probe" the communication link for block fading. For instance, the base station 105-d may increase a frequency of reference signals transmitted to the UE 115-c in order to probe the communication link for block fading, where the UE 115-c may transmit feedback messages (e.g., ACK messages, NACK messages) in response to the signals received from the base station 105-d. In this regard, the ACK/NACK messages received from the UE 115-c may provide an indication of the channel quality.

At 520, the base station 105-d may determine a block fading pattern associated with the communication link between the UE 115-c and the base station 105-d. As noted previously herein, the block fading pattern may include a periodic, quasi-periodic, or aperiodic pattern of fluctuating channel quality, as shown in FIG. 3. In some aspects, the base station 105-d may determine/identify one or more characteristics of the block fading pattern including, but not limited to, a periodicity (e.g., period 310-a, 310-b, time intervals/durations of good channel quality, time intervals/durations of poor channel quality, and the like), a duration (e.g., one or more on or off durations), one or more offsets, a strength of the block fading pattern, a quality metric associated with the block fading pattern, or any combination thereof. The base station 105-d may determine the block fading pattern using any metrics known in the art including, but not limited to, SINR, SNR, RSSI, and the like.

The base station 105-d may determine the block fading pattern according to various techniques. For example, in some aspects, the base station 105-d may determine the block fading pattern based on the measurement of the signals performed at 510. For instance, the base station 105-d may measure signals received from the UE 115-c at 510 (e.g., SINR measurements, SNR measurements), and may determine the block fading pattern based on the measurements of the signals.

By way of another example, the base station 105-d may determine the block fading pattern based on the feedback messages received at 515. For instance, the base station 105-d may "probe" the communication link by transmitting signals (e.g., reference signals) to the UE 115-c at 505, where the UE 115-c may transmit feedback messages (e.g., ACK messages, NACK messages) in response to the signals. In this example, the received feedback messages may provide an indication of a level of channel quality, and the base station 105-d may determine the block fading pattern based on the received feedback messages.

In some aspects, the base station 105-d may determine the block fading pattern based on a periodic or aperiodic beam transmission pattern used by the base station 105-d. For example, in some cases, the base station 105-d may transmit signals to the UE 115-c via a plurality of beams based on a periodic beam transmission pattern. For instance, the periodic beam transmission pattern may cause the base station 105-d to switch between the plurality of beams for transmissions (e.g., beam sweeping pattern). In this example, the base station 105-d may determine the block fading pattern based on the periodic beam transmission pattern. For instance, in some cases, the base station 105-d may determine that the block fading pattern is attributable to the periodic beam transmission pattern using the measurements performed at 510.

In additional or alternative aspects, the base station 105-d may determine the block fading pattern based on a resource allocation scheme. For example, in some cases, the base station 105-d may be configured such that it is allowed to communicate with the UE 115-c within a subset of time-domain resources. This may be due to an unavailability of resources. The communication resources allocated to the base station 105-d may be determined according to a periodic resource allocation scheme or a periodic scheduling scheme. In this example, the base station 105-d may determine the block fading pattern based on the periodic resource allocation scheme and/or the periodic scheduling scheme. In this regard, the base station 105-d may determine that the block fading pattern is attributable to the periodic resource allocation scheme/periodic scheduling scheme using the measurements performed at 510.

In some aspects, the base station 105-d may determine the block fading pattern based on communications carried out with another wireless device. For example, in some cases, the base station 105-d may communicate with a third wireless device (e.g., wireless device 565-a) different from the UE 115-c via a second communication link. The wireless device 565-a may include another UE 115 or another base station 105. In this example, the base station 105-d may determine the block fading pattern associated with the communication link with the UE 115-c based on the communications with the wireless device 565-a. For instance, in some cases, the base station 105-d may determine characteristics of the second communication link while communicating with the wireless device 565-a, and may thereby determine the block fading pattern of the communication link with the UE 115-c based on the determined characteristics of the second communication link.

In some aspects, the base station 105-d may determine the block fading pattern based on a measurement report received from another wireless device. The measurement report may include an indication of the block fading pattern. In some aspects, the measurement report may be received from the UE 115-c and/or another wireless device (e.g., wireless device 565-a). The measurement report may represent an example of the signaling 215 described with reference to FIG. 2. For example, the measurement report may indicate e one or more parameters associated with the block fading pattern, such as a periodicity of the block fading pattern, a duration of the block fading pattern, an offset of the block fading pattern, a strength of the block fading pattern, a quality metric associated with the block fading pattern, or any combination thereof.

In some aspects, the base station 105-d may determine the block fading pattern based on the existence of a relay device. For example, as described previously herein with respect to FIG. 2, a base station 105 or another device may serve as a relay device (e.g., repeater) configured to relay communications between a first UE (e.g., UE 115-c), another UE 115, a first base station (e.g., base station 105-d), and/or another base station 105. In this example, the UE 115-c illustrated in FIG. 5 may communicate with another UE 115 via the relay device, and the UE 115-c or the other UE 115, or both, may determine the block fading pattern based on the communications relayed by the relay device over the communication link between the UE 115-c and the other UE 115. Additionally or alternatively, the UE 115-c illustrated in FIG. 5 may communicate with the base station 105-d via the relay device, and the UE 115-c or the base station 105-d, or both, may determine the block fading pattern based on the communications relayed by the relay device over the communication link between the UE 115-c and the base station 105-d. As noted previously herein, a relay device may result in a periodic or quasi-periodic change in the propagation of the signals, thereby resulting in a block fading pattern. In this regard, by identifying that communications between the UE 115-c and the base station 105-d are relayed via the relay device, the UE 115-c or the base station 105-d, or both, may determine the block fading pattern based on communicating via the relay device.

In some aspects, the base station 105-d may determine the block fading pattern based on the existence of another communication link which is interfering with the communication link between the UE 115-c and the base station 105-d. For example, the base station 105-d may identify a communication link (or signals) which is interfering with the communication link between the UE 115-c and the base station 105-d. The interfering communication link may include a communication link between the base station 105-d and another wireless device (e.g., another UE 115 or another base station 105), a communication link between two other wireless devices which do not include the UE 115-c or the base station 105-d, and the like. In this example, upon determining the interfering communication link, the base station 105-d may determine the block fading pattern based on the interring communication link.

At 525, the base station 105-d may selectively adjust one or more communications parameters for communicating with the UE 115-c over the communication link. In some aspects, the base station 105-d may selectively adjust one or more communications parameters based on the determined block fading pattern.

The base station 105-d may selectively adjust the one or more communications parameters using a variety of techniques. For example, in some aspects, the base station 105-d may selectively adjust a beamforming configuration for transmitting and/or receiving signals to/from the UE 115-c via the communication link. For instance, the base station 105-d may selectively adjust a beam direction, a beam sweeping pattern, a beam sweeping periodicity, a beam sweeping order, or the like.

In some aspects, the base station 105-d may selectively adjust a resource configuration associated with the communication link between the UE 115-c and the base station 105-d. In some aspects, the base station 105-d may selectively adjust the resource configuration by selectively adjusting a TDD configuration, a slot format configuration, or any combination thereof. In such cases, the selection and/or adjustment of such configurations may enable the base station 105-d to refrain from communicating over the communication link for durations of relatively low channel quality (e.g., by assigning time periods (symbols/slots) as flexible resources), thereby enabling power savings for at least the base station 105-d.

Similarly, the base station 105-d may selectively adjust an allocation of reference signals (e.g., beam reference signals, synchronization signals, synchronization signal blocks, or the like) transmitted from the base station 105-d to the UE 115-c based on the block fading pattern. In such cases, the reference signals may be allocated such that they are transmitted when the channel exhibits good quality (e.g., corresponding to the block fading pattern). Additionally, in some cases, the base station 105-d may selectively adjust a resource allocation scheme. For example, in cases where the base station 105-d identifies that the block fading pattern is attributable to a periodic resource allocation scheme, the base station 105-d may selectively adjust the periodic resource allocation scheme in order to address/mitigate the effects of block fading.

By way of another example, the base station 105-d may selectively adjust a link management configuration used by the UE 115-c or the base station 105-d. The link management configuration may be used to refer to a set of parameters or characteristics used by the UE 115-c and/or base station 105-d to determine a link failure of the communication link between the UE 115-c and the base station 105-d. In this regard, the link management configuration may include a set of link management parameters or a set of timers which are used to determine a link failure of the communication link. For instance, the base station 105-d may selectively adjust a timer used by the UE 115-c to determine a link failure based on the block fading pattern in order to prevent the UE 115-c from unnecessarily or frequently determining a failure event of the communication link.

In some aspects, the base station 105-d may selectively adjust a schedule of signals (e.g., uplink signals or downlink signals) transmitted by, or received from, the UE 115-c over the communication link based on the block fading pattern. For example, the base station 105-d may identify one or more time periods over which the communication link exhibits relatively poor channel quality (e.g., relatively low SINR) based on the block fading pattern. In this example, the base station 105-d may selectively adjust a schedule of downlink signals transmitted to the UE 115-c such that the downlink signals are not transmitted during the one or more time periods of the block fading pattern which exhibit poor channel quality.

In some aspects, the base station 105-d may selectively adjust one or more measurement parameters for measuring the communication link between the UE 115-c and the base station 105-d. The base station 105-d may selectively adjust the one or more measurement parameters based on the determined block fading pattern. For example, the base station 105-d may selectively adjust measurement parameters including, but not limited to, a filtering coefficient for beam measurements, a filtering coefficient for channel measurements, or any combination thereof. Similarly, the base station 105-d may selectively adjust algorithms used for channel estimation, interference estimation, and the like. For example, the base station 105-d may selectively adjust a channel estimation procedure, an interference cancellation procedure, synchronization parameters, a receiver algorithm, or any combination thereof. In this regard, the base station 105-d may adjust characteristics of the base station 105-d itself in order to improve communications over the communication link.

At 530, the base station 105-d may transmit a signal including an indication for the UE 115-c to adjust one or more characteristics/communications parameters associated with the communication link. In some aspects, the base station 105-d may transmit the indication for the UE 115-c to adjust one or more characteristics/communications parameters associated with the communication link based on the block fading pattern. In this regard, in addition to selectively adjusting communications parameters itself at 525, the base station 105-d may transmit signaling configured to cause the UE 115-c to additionally or alternatively adjust communications parameters.

For example, the base station 105-d may identify one or more time periods over which the communication link exhibits relatively poor channel quality (e.g., relatively low SINR) based on the block fading pattern. In this example, the signal transmitted by the base station 105-d at 530 may include an indication which includes a request for the UE 115-c to refrain from transmitting uplink signals to the base station 105-d during the one or more time periods of the block fading pattern which exhibit poor channel quality.

At 535, the base station 105-d may generate a feedback report. In some aspects, the base station 105-d may generate the feedback report based on the block fading pattern. The feedback report may include an indication of a state of the communication link between the UE 115-*c* and the base station 105-*d*. In other cases, the feedback report may include an explicit indication of the block fading pattern. For example, the feedback report may indicate one or more parameters associated with the block fading pattern, as described herein.

At 540 and 545, the base station 105-*d* may transmit the feedback report to the one or more other wireless devices. For example, at 540, the base station 105-*d* may transmit the feedback report to the wireless device 565-*a*, and at 545 the base station 105-*d* may transmit the feedback report to the UE 115-*c*. In some aspects, the base station 105-*d* may generate and transmit the feedback report to one or more other wireless devices (e.g., wireless device 565-*a*, UE 115-*c*) in order to provide the network (e.g., wireless communications system 100, 200) with information regarding the identified block fading pattern. In this regard, the feedback report may be transmitted to the UE 115-*c* and/or other wireless devices 565-*a*. As noted previously herein, the wireless device 565-*a* may include any other wireless device known in the art including, but not limited to, a UE 115, a central unit, a parent IAB node, a neighboring node, and the like.

At 550, the base station 105-*d* may identify a subset of communication resources which are affected by the block fading pattern. In some aspects, the subset of communication resources may be identified from a larger set of communication resources used for communicating with the UE 115-*c* via the communication link. In some aspects, the subset of communication resources may include any resources which are unusable, or otherwise negatively impacted/affected by the block fading pattern. For example, in some aspects, the base station 105-*d* may identify communication resources associated with one or more time periods which exhibit relatively poor channel quality (e.g., relatively low SINR) as a result of the block fading pattern. The subset of communication resources identified by the base station 105-*d* may include any communication resources known in the art including, but not limited to, time resources, frequency resources, and the like.

At 555, the base station 105-*d* may release the subset of communication resources to the wireless device 565-*a*. In some aspects, the base station 105-*d* may release the identified communication resources by transmitting a signal to the wireless device 565-*a*, the signal including an indication that the wireless device 565-*a* is permitted to use the identified communication resources.

For example, in some cases, the wireless device 565-*a* may include an IAB node associated with the base station 105-*d*. For instance, the wireless device 565-*a* may include an IAB node which supports communications by the base station 105-*d* (e.g., "child" IAB node). In this example, communication resources may be designated or otherwise allocated for use by the base station 105-*d*, and the wireless device 565-*a* may utilize communication resources which are allocated to it by the base station 105-*d*. Upon identifying the subset of communication resources which are affected by the block fading pattern, the base station 105-*d* may identify that the subset of communication resources are less valuable, or otherwise under-utilized in carrying out communications with the UE 115-*c*. In this regard, the base station 105-*d* may release the identified subset of communication resources to the wireless device 565-*a*. Accordingly, by releasing communication resources which are negatively affected by a block fading pattern, aspects of the present disclosure may enable more efficient utilization of communication resources within a wireless communications system 100, 200.

At 560, the base station 105-*d* may communicate with the UE 115-*c* using the one or more adjusted communications parameters. For example, in cases where the base station 105-*d* selectively adjusts beamforming characteristics used by the base station 105-*d* at 525, the base station 105-*d* may then use the adjusted beamforming characteristics when communicating with the UE 115-*c* via the communication link at 560.

In some aspects, FIG. 5 is shown and described as including the base station 105-*d* carrying out particular steps/functions of process flow 500. However, any processing shown as being carried out by the base station 105-*d* may additionally and/or alternatively be carried out by the UE 115-*c*, unless noted otherwise herein. For example, the UE 115-*c* may determine the block fading pattern at 520, selectively adjust communications parameters at 525, and the like.

Figure 6:
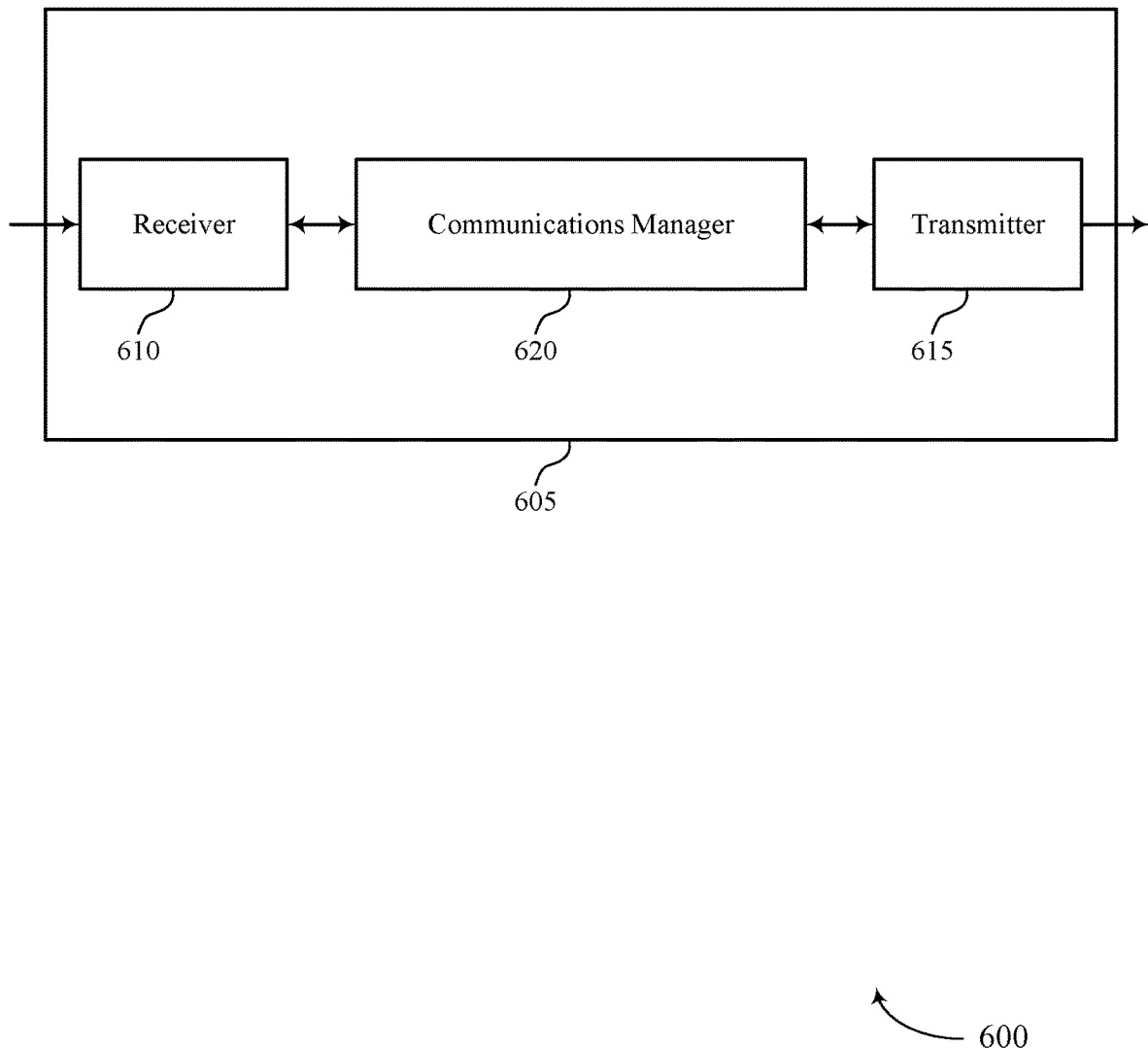
FIGS. 6 and 7 show block diagrams of devices that support estimation and utilization of a block fading wireless channel in accordance with one or more aspects of the present disclosure.

FIG. 6 shows a block diagram 600 of a device 605 that supports estimation and utilization of a block fading wireless channel in accordance with one or more aspects of the present disclosure. The device 605 may be an example of aspects of a UE 115 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to estimation and utilization of a block fading wireless channel). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to estimation and utilization of a block fading wireless channel). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of estimation and utilization of a block fading wireless channel as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. For example, the communications manager 620 may be configured as or otherwise support a means for determining a block fading pattern associated with a communication link between the first wireless device and a second wireless device, the block fading pattern including a pattern of fluctuating channel quality. The communications manager 620 may be configured as or otherwise support a means for communicating with the second wireless device over the communication link based on one or more adjusted communications parameters, the one or more communications parameters being adjusted based on the determined block fading pattern.

Figure 7:
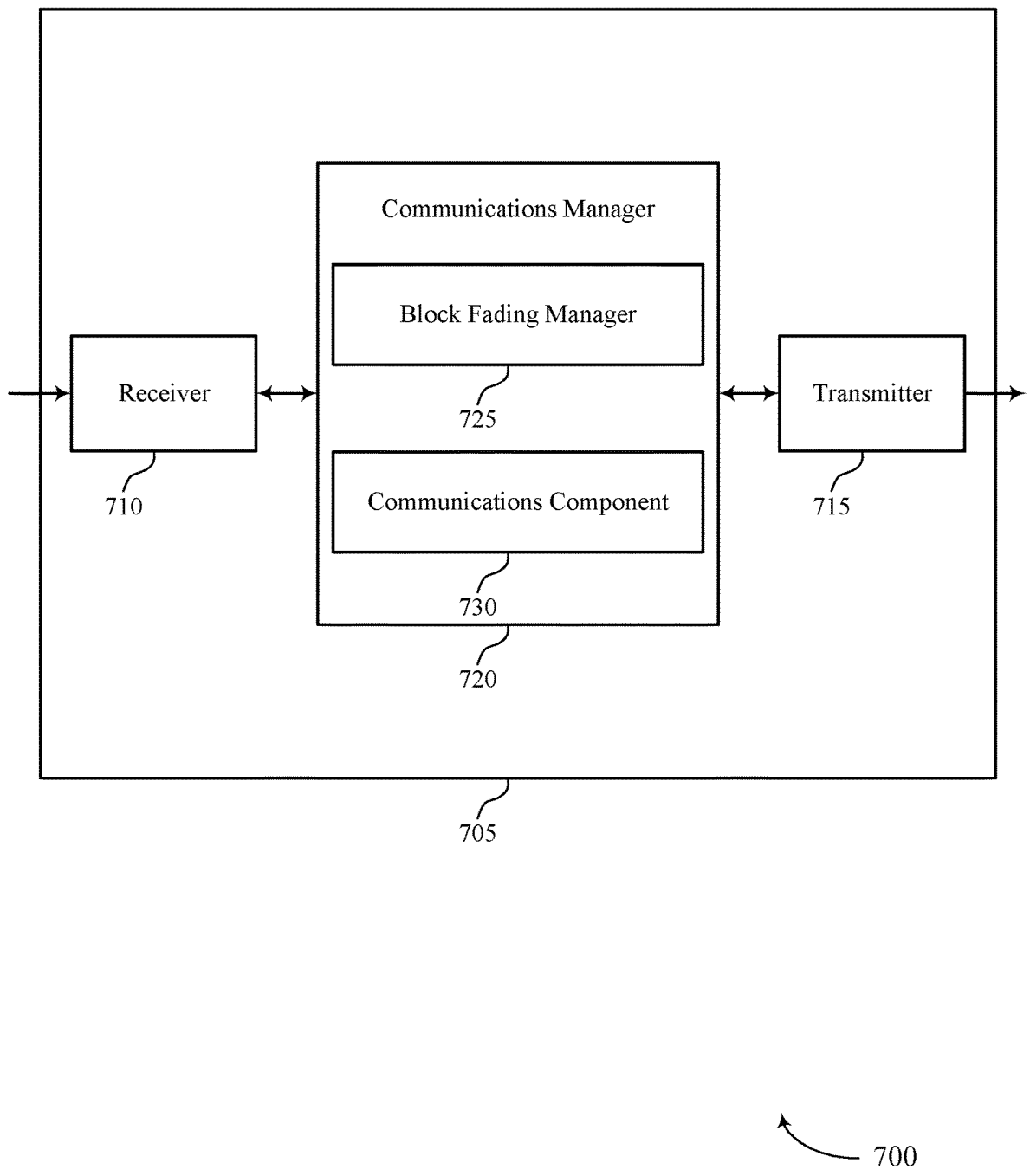

FIG. 7 shows a block diagram 700 of a device 705 that supports estimation and utilization of a block fading wireless channel in accordance with one or more aspects of the present disclosure. The device 705 may be an example of aspects of a device 605, a UE 115, or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to estimation and utilization of a block fading wireless channel). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to estimation and utilization of a block fading wireless channel). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of estimation and utilization of a block fading wireless channel as described herein. For example, the communications manager 720 may include a block fading manager 725 a communications component 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first wireless device in accordance with examples as disclosed herein. The block fading manager 725 may be configured as or otherwise support a means for determining a block fading pattern associated with a communication link between the first wireless device and a second wireless device, the block fading pattern including a pattern of fluctuating channel quality. The communications component 730 may be configured as or otherwise support a means for communicating with the second wireless device over the communication link based on one or more adjusted communications parameters, the one or more communications parameters being adjusted based on the determined block fading pattern.

Figure 8:
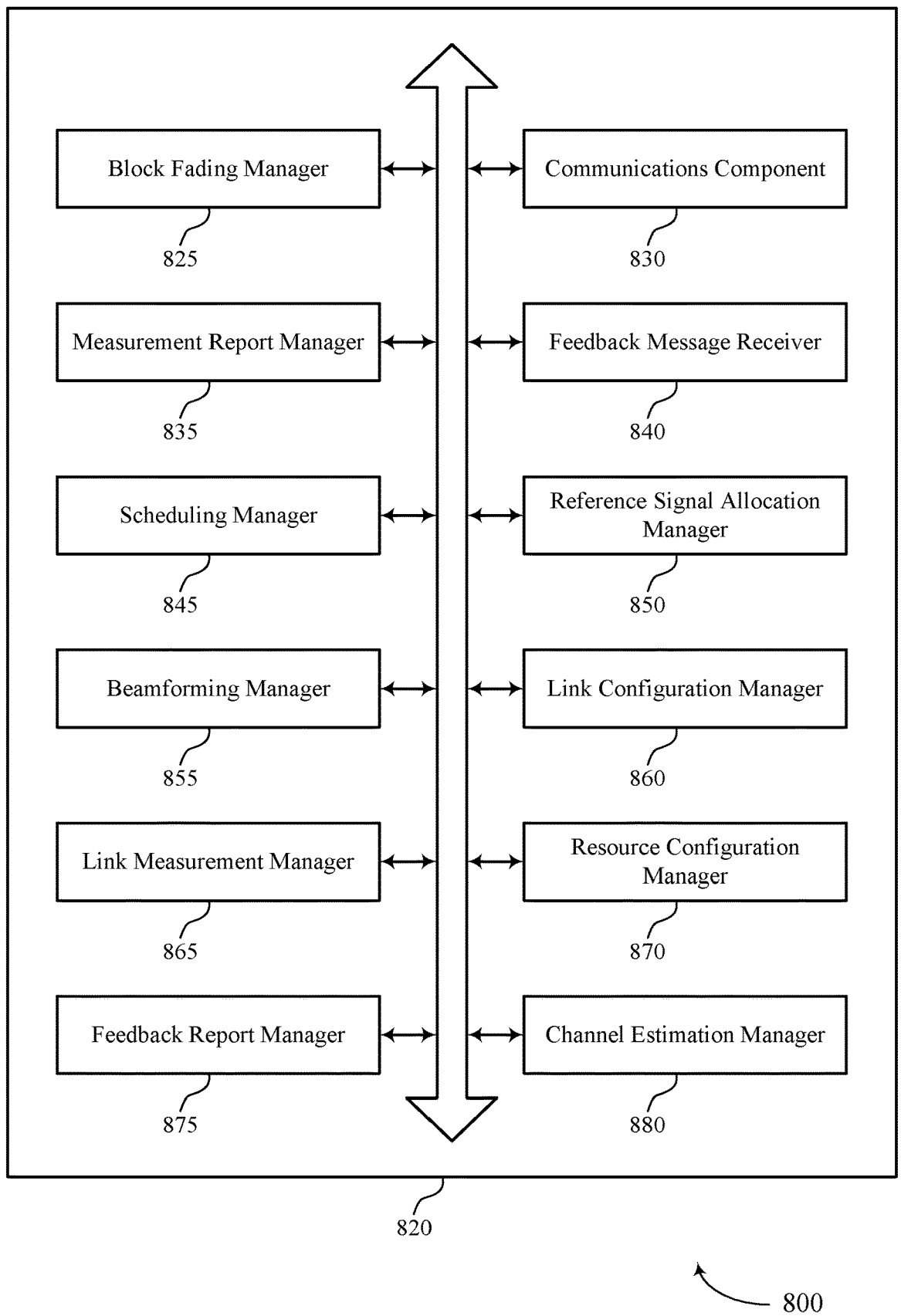
FIG. 8 shows a block diagram of a communications manager that supports estimation and utilization of a block fading wireless channel in accordance with one or more aspects of the present disclosure.

FIG. 8 shows a block diagram 800 of a communications manager 820 that supports estimation and utilization of a block fading wireless channel in accordance with one or more aspects of the present disclosure. The communications manager 820 may be an example of aspects of a communications manager 620, a communications manager 720, or both, as described herein. The communications manager 820, or various components thereof, may be an example of means for performing various aspects of estimation and utilization of a block fading wireless channel as described herein. For example, the communications manager 820 may include a block fading manager 825, a communications component 830, a measurement report manager 835, a feedback message receiver 840, a scheduling manager 845, a reference signal allocation manager 850, a beamforming manager 855, a link configuration manager 860, a link measurement manager 865, a resource configuration manager 870, a feedback report manager 875, a channel estimation manager 880, or any combination thereof. Each of these components may communicate, directly or indirectly, with one another (e.g., via one or more buses).

The communications manager 820 may support wireless communications at a first wireless device in accordance with examples as disclosed herein. The block fading manager 825 may be configured as or otherwise support a means for determining a block fading pattern associated with a communication link between the first wireless device and a second wireless device, the block fading pattern including a pattern of fluctuating channel quality. The communications component 830 may be configured as or otherwise support a means for communicating with the second wireless device over the communication link based on one or more adjusted communications parameters, the one or more communications parameters being adjusted based on the determined block fading pattern.

In some examples, the block fading manager 825 may be configured as or otherwise support a means for transmitting, to one or more other devices including at least the second wireless device, signaling that indicates one or more parameters associated with the block fading pattern, the one or more parameters including a periodicity of the block fading pattern, a duration of the block fading pattern, an offset of the block fading pattern, a strength of the block fading pattern, a quality metric associated with the block fading pattern, or any combination thereof.

In some examples, to support transmitting the signaling, the block fading manager 825 may be configured as or otherwise support a means for transmitting the signaling via a sidelink communication link, an uplink communication link, a downlink communication link, a backhaul link, or any combination thereof, where each of the first wireless device and the second wireless device is a UE, a base station, or a network node. In some examples, the signaling includes RRC signaling, DCI, SCI, UCI, a MAC-CE, or any combination thereof that conveys an indication of the one or more parameters associated with the block fading pattern.

In some examples, to support determining the block fading pattern, the communications component 830 may be configured as or otherwise support a means for receiving one or more signals from the second wireless device over the communication link. In some examples, to support determining the block fading pattern, the block fading manager 825 may be configured as or otherwise support a means for determining the block fading pattern based on measurements of the one or more signals received from the second wireless device.

In some examples, to support determining the block fading pattern, the measurement report manager 835 may be configured as or otherwise support a means for receiving a measurement report from at least one of the second wireless device or a third wireless device that indicates one or more parameters associated with the block fading pattern, the one or more parameters including a periodicity of the block fading pattern, a duration of the block fading pattern, an offset of the block fading pattern, a strength of the block fading pattern, a quality metric associated with the block fading pattern, or any combination thereof. In some examples, to support determining the block fading pattern, the block fading manager 825 may be configured as or otherwise support a means for determining the block fading pattern based on the received measurement report and the one or more parameters.

In some examples, to support determining the block fading pattern, the communications component 830 may be configured as or otherwise support a means for transmitting one or more signals to the second wireless device over the communication link. In some examples, to support determining the block fading pattern, the feedback message receiver 840 may be configured as or otherwise support a means for receiving one or more feedback messages from the second wireless device in response to the transmitted one or more signals, the one or more feedback messages including one or more parameters associated with the block fading pattern, where the one or more parameters include a periodicity of the block fading pattern, a duration of the block fading pattern, an offset of the block fading pattern, a strength of the block fading pattern, a quality metric associated with the block fading pattern, or any combination thereof. In some examples, to support determining the block fading pattern, the block fading manager 825 may be configured as or otherwise support a means for determining the block fading pattern based on the one or more feedback messages received from the second wireless device and the one or more parameters.

In some examples, to support determining the block fading pattern, the communications component 830 may be configured as or otherwise support a means for communicating with a third wireless device different from the second wireless device. In some examples, to support determining the block fading pattern, the block fading manager 825 may be configured as or otherwise support a means for determining the block fading pattern based on communicating with the third wireless device.

In some examples, the scheduling manager 845 may be configured as or otherwise support a means for selectively adjusting a schedule of signals transmitted over the communication link. In some examples, the reference signal allocation manager 850 may be configured as or otherwise support a means for selectively adjusting an allocation of reference signals transmitted from the first wireless device to the second wireless device.

In some examples, the beamforming manager 855 may be configured as or otherwise support a means for selectively adjusting a beamforming configuration for the communication link between the first wireless device and the second wireless device. In some examples, the beamforming manager 855 may be configured as or otherwise support a means for selectively adjusting a set of beam directions, a beam sweeping pattern, a beam sweeping periodicity, a beam sweeping order, or any combination thereof.

In some examples, the link configuration manager 860 may be configured as or otherwise support a means for selectively adjusting a link management configuration used by the first wireless device or the second wireless device for the communication link, the link management configuration including one or more of a set of link management parameters or a set of timers associated with determining a link failure of the communication link.

In some examples, the link measurement manager 865 may be configured as or otherwise support a means for selectively adjusting one or more measurement parameters for measuring the communication link, the one or more measurement parameters including a filtering coefficient for beam measurements, a filtering coefficient for channel measurements, or any combination thereof.

In some examples, the resource configuration manager 870 may be configured as or otherwise support a means for selectively adjusting a resource configuration associated with the communication link, the resource configuration including a TDD configuration, a slot format configuration, or any combination thereof.

In some examples, the communications component 830 may be configured as or otherwise support a means for identifying a subset of communication resources from a set of communication resources used for communicating with the second wireless device that are affected by the block fading pattern on the communication link. In some examples, the communications component 830 may be configured as or otherwise support a means for releasing the identified subset of communication resources for use by one or more other wireless devices associated with the first wireless device. In some examples, to support releasing the identified subset of communication resources, the communications component 830 may be configured as or otherwise support a means for releasing the subset of communication resources for use by an IAB node associated with the first wireless device.

In some examples, the feedback report manager 875 may be configured as or otherwise support a means for generating a feedback report indicating a state of the communication link based on the determined block fading pattern. In some examples, the feedback report manager 875 may be configured as or otherwise support a means for transmitting the feedback report to one or more nodes, where the one or more nodes include the second wireless device, a central unit, a parent IAB node, a neighboring node, or any combination thereof.

In some examples, the channel estimation manager 880 may be configured as or otherwise support a means for selectively adjusting a channel estimation procedure, an interference cancellation procedure, synchronization parameters, a receiver algorithm, or any combination thereof.

In some examples, the link configuration manager 860 may be configured as or otherwise support a means for transmitting a signal to the second wireless device based on detecting the block fading pattern, the signal including an indication for the second wireless device to adjust one or more characteristics associated with the communication link. In some examples, the indication includes a request for the second wireless device to refrain from transmitting signals to the first wireless device during one or more time periods corresponding to the determined block fading pattern.

In some examples, to support transmitting the signal to the second wireless device, the measurement report manager 835 may be configured as or otherwise support a means for generating a measurement report based on measuring one or more signals received over the communication link. In some examples, to support transmitting the signal to the second wireless device, the measurement report manager 835 may be configured as or otherwise support a means for transmitting, to the second wireless device, the measurement report including an indication of the determined block fading pattern.

In some examples, to support determining the block fading pattern, the beamforming manager 855 may be configured as or otherwise support a means for transmitting one or more signals to the second wireless device via a set of multiple beams based on a periodic beam transmission pattern. In some examples, to support determining the block fading pattern, the block fading manager 825 may be configured as or otherwise support a means for determining the block fading pattern based on the periodic beam transmission pattern, where the block fading pattern includes a block fading pattern in accordance with the periodic beam transmission pattern.

In some examples, to support determining the block fading pattern, the communications component 830 may be configured as or otherwise support a means for communicating with the second wireless device via a relay device that relays communications between the first wireless device and the second wireless device. In some examples, to support determining the block fading pattern, the block fading manager 825 may be configured as or otherwise support a means for determining the block fading pattern based on the communications relayed by the relay device over the communication link.

In some examples, to support determining the block fading pattern, the communications component 830 may be configured as or otherwise support a means for communicating with the second wireless device based on a resource allocation scheme. In some examples, to support determining the block fading pattern, the block fading manager 825 may be configured as or otherwise support a means for determining the block fading pattern based on the resource allocation scheme.

Figure 9:
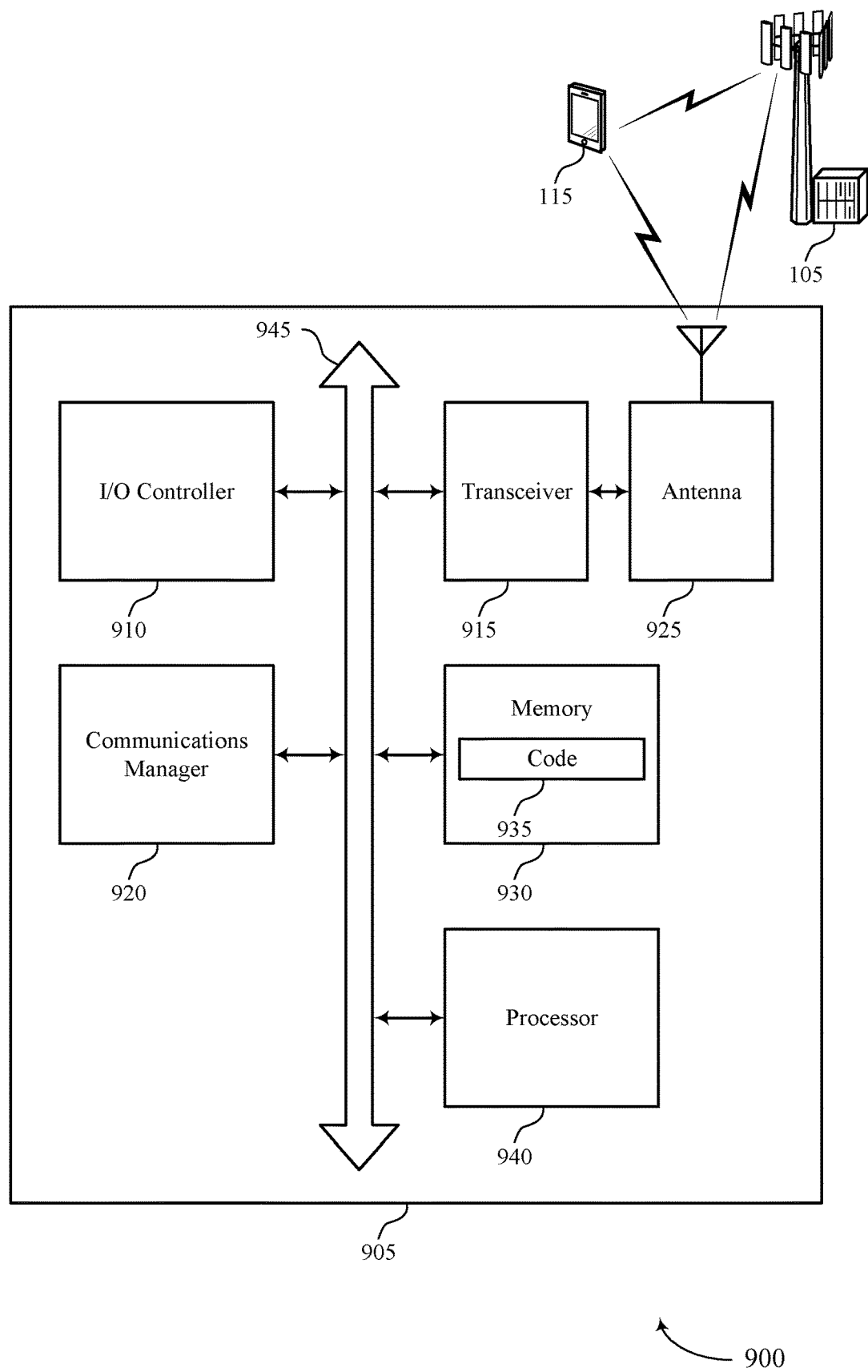
FIG. 9 shows a diagram of a system including a UE that supports estimation and utilization of a block fading wireless channel in accordance with one or more aspects of the present disclosure.

FIG. 9 shows a diagram of a system 900 including a device 905 that supports estimation and utilization of a block fading wireless channel in accordance with one or more aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed)

to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting estimation and utilization of a block fading wireless channel). For example, the device 905 or a component of the device 905 may include a processor 940 and memory 930 coupled to the processor 940, the processor 940 and memory 930 configured to perform various functions described herein.

The communications manager 920 may support wireless communications at a first wireless device in accordance with examples as disclosed herein. For example, the communications manager 920 may be configured as or otherwise support a means for determining a block fading pattern associated with a communication link between the first wireless device and a second wireless device, the block fading pattern including a pattern of fluctuating channel quality. The communications manager 920 may be configured as or otherwise support a means for communicating with the second wireless device over the communication link based on one or more adjusted communications parameters, the one or more communications parameters being adjusted based on the determined block fading pattern.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of estimation and utilization of a block fading wireless channel as described herein, or the processor 940 and the memory 930 may be otherwise configured to perform or support such operations.

Figure 10:
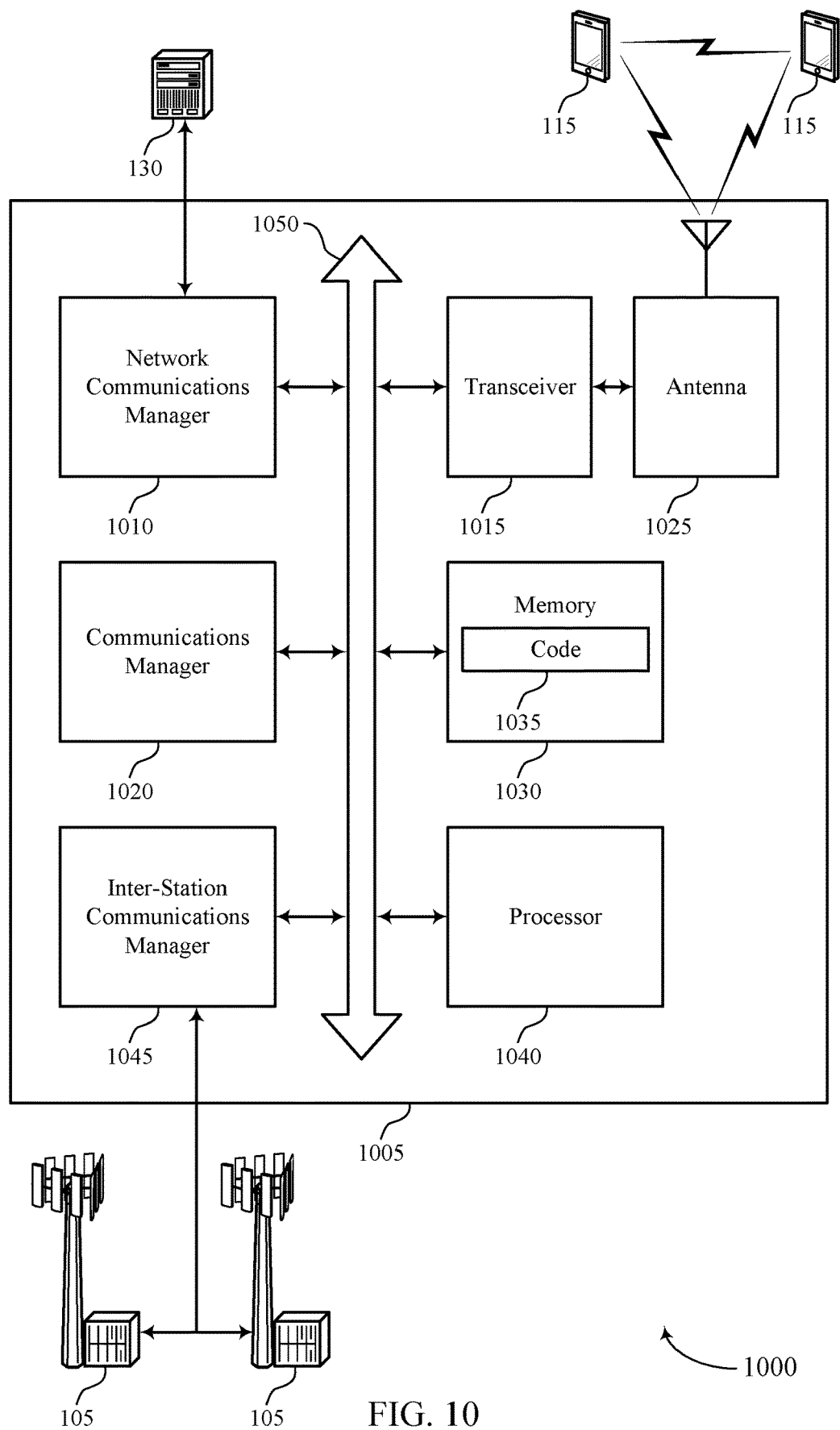
FIG. 10 shows a diagram of a system including a base station that supports estimation and utilization of a block fading wireless channel in accordance with one or more aspects of the present disclosure.

FIG. 10 shows a diagram of a system 1000 including a device 1005 that supports estimation and utilization of a block fading wireless channel in accordance with one or more aspects of the present disclosure. The device 1005 may be an example of or include the components of a device 605, a device 705, or a base station 105 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 615, a transmitter 715, a receiver 610, a receiver 710, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting estimation and utilization of a block fading wireless channel). For example, the device 1005 or a component of the device 1005 may include a processor 1040 and memory 1030 coupled to the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

The communications manager 1020 may support wireless communications at a first wireless device in accordance with examples as disclosed herein. For example, the communications manager 1020 may be configured as or otherwise support a means for determining a block fading pattern associated with a communication link between the first wireless device and a second wireless device, the block fading pattern including a pattern of fluctuating channel quality. The communications manager 1020 may be configured as or otherwise support a means for communicating with the second wireless device over the communication link based on one or more adjusted communications parameters, the one or more communications parameters being adjusted based on the determined block fading pattern.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of estimation and utilization of a block fading wireless channel as described herein, or the processor 1040 and the memory 1030 may be otherwise configured to perform or support such operations.

Figure 11:
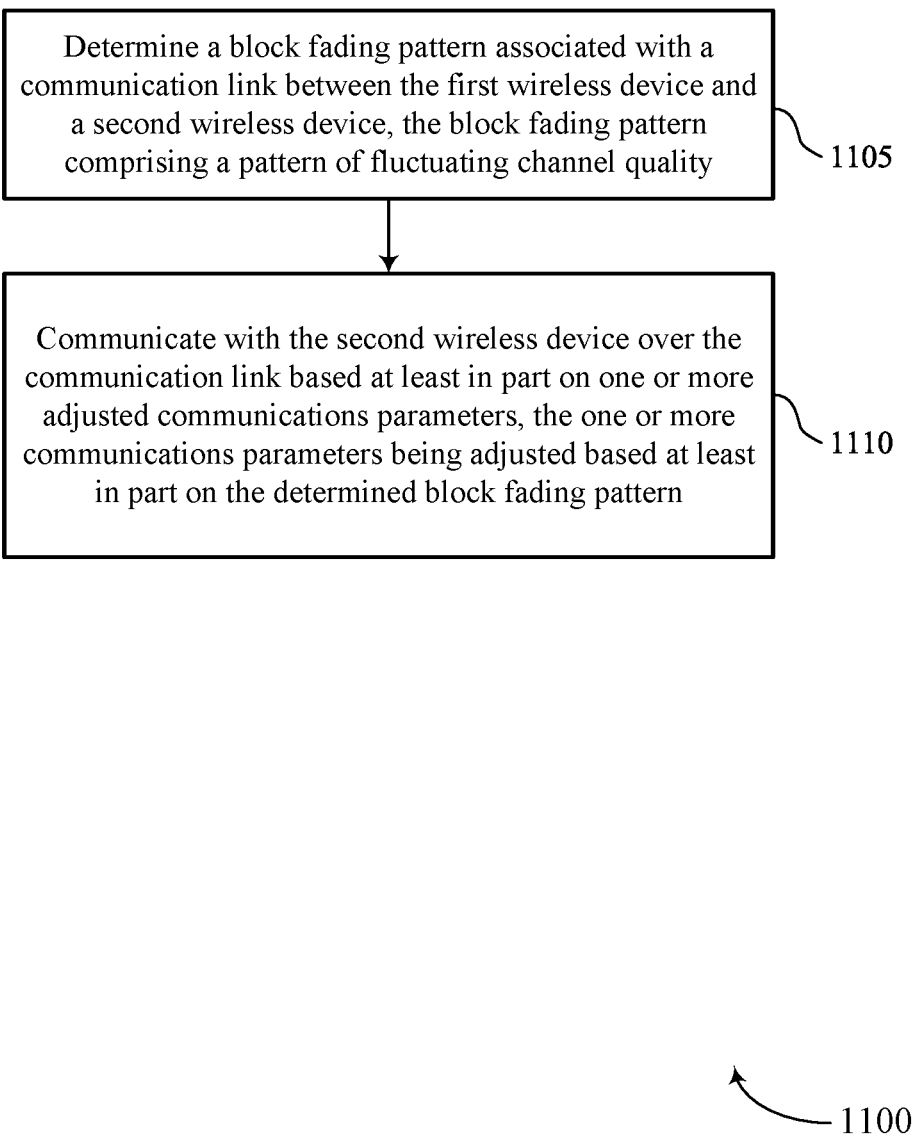
FIGS. 11 through 17 show flowcharts illustrating methods that support estimation and utilization of a block fading wireless channel in accordance with one or more aspects of the present disclosure.

FIG. 11 shows a flowchart illustrating a method 1100 that supports estimation and utilization of a block fading wireless channel in accordance with one or more aspects of the present disclosure. The operations of the method 1100 may be implemented by a UE or a base station or its components as described herein. For example, the operations of the method 1100 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1105, the method may include determining a block fading pattern associated with a communication link between the first wireless device and a second wireless device, the block fading pattern including a pattern of fluctuating channel quality. The operations of 1105 may be performed in accordance with examples as disclosed herein. In some examples, aspects of the operations of 1105 may be performed by a block fading manager 825 as described with reference to FIG. 8.

At 1110, the method may include communicating with the second wireless device over the communication link based on one or more adjusted communications parameters, the one or more communications parameters being adjusted based on the determined block fading pattern. The operations of 1110 may be performed in accordance with examples as disclosed herein. In some examples, aspects of the operations of 1110 may be performed by a communications component 830 as described with reference to FIG. 8.

Figure 12:
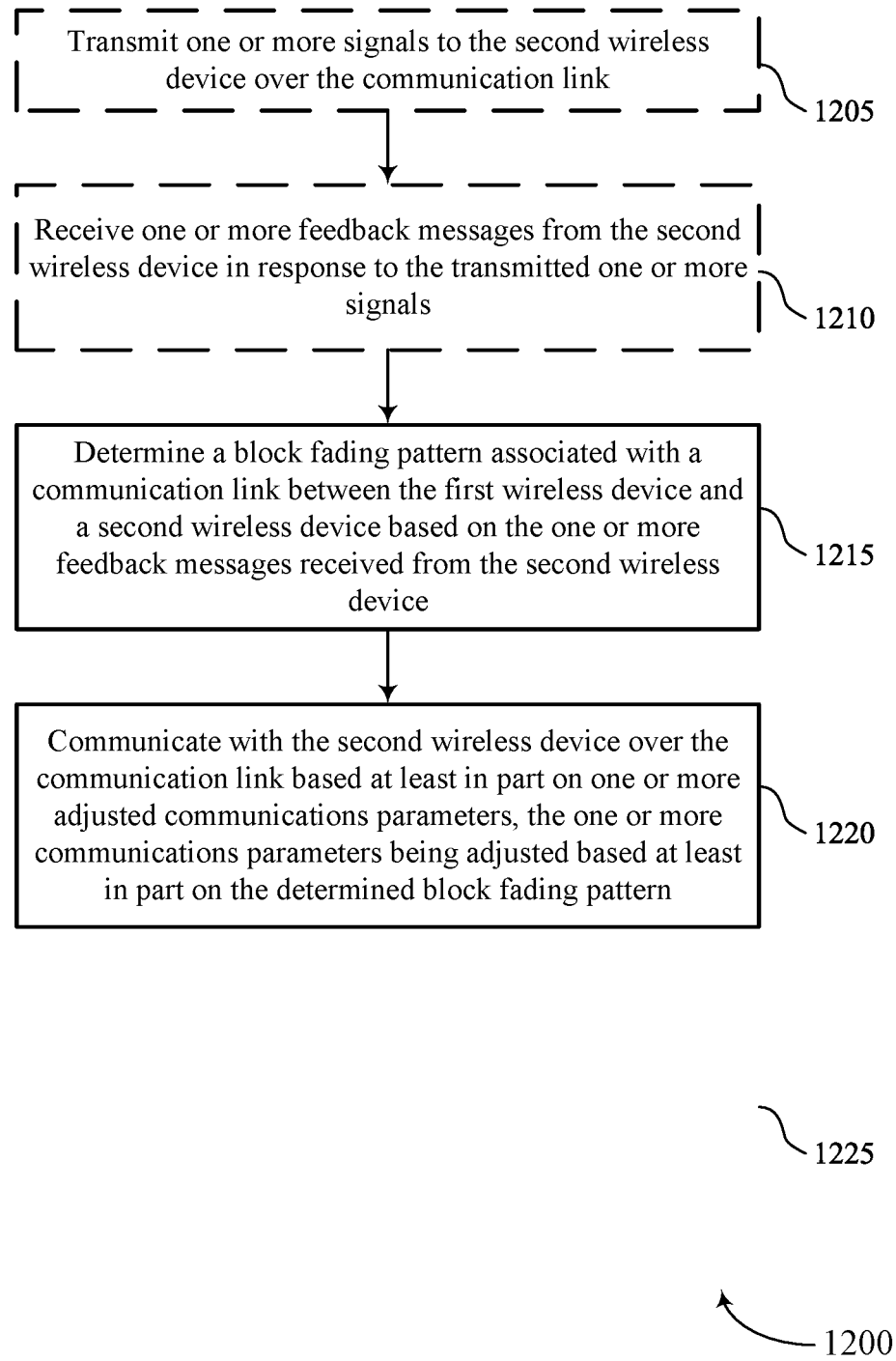

FIG. 12 shows a flowchart illustrating a method 1200 that supports estimation and utilization of a block fading wireless channel in accordance with one or more aspects of the present disclosure. The operations of the method 1200 may be implemented by a UE or a base station or its components as described herein. For example, the operations of the method 1200 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1205, in some examples, the method may include transmitting one or more signals to the second wireless device over the communication link. The operations of 1205 may be performed in accordance with examples as disclosed herein. In some examples, aspects of the operations of 1205 may be performed by a communications component 830 as described with reference to FIG. 8.

At 1210, in some examples, the method may include receiving one or more feedback messages from the second wireless device in response to the transmitted one or more signals, the one or more feedback messages including one or more parameters associated with the block fading pattern, where the one or more parameters include a periodicity of the block fading pattern, a duration of the block fading pattern, an offset of the block fading pattern, a strength of the block fading pattern, a quality metric associated with the block fading pattern, or any combination thereof. The operations of 1210 may be performed in accordance with examples as disclosed herein. In some examples, aspects of the operations of 1210 may be performed by a feedback message receiver 840 as described with reference to FIG. 8.

At 1215, the method may include determining the block fading pattern associated with a communication link between the first wireless device and a second wireless device based on the one or more feedback messages received from the second wireless device and the one or more parameters, the block fading pattern including a pattern of fluctuating channel quality. The operations of 1215 may be performed in accordance with examples as disclosed herein. In some examples, aspects of the operations of 1215 may be performed by a block fading manager 825 as described with reference to FIG. 8.

At 1220, the method may include communicating with the second wireless device over the communication link based on one or more adjusted communications parameters, the one or more communications parameters being adjusted based on the determined block fading pattern. The operations of 1220 may be performed in accordance with examples as disclosed herein. In some examples, aspects of the operations of 1220 may be performed by a communications component 830 as described with reference to FIG. 8.

Figure 13:
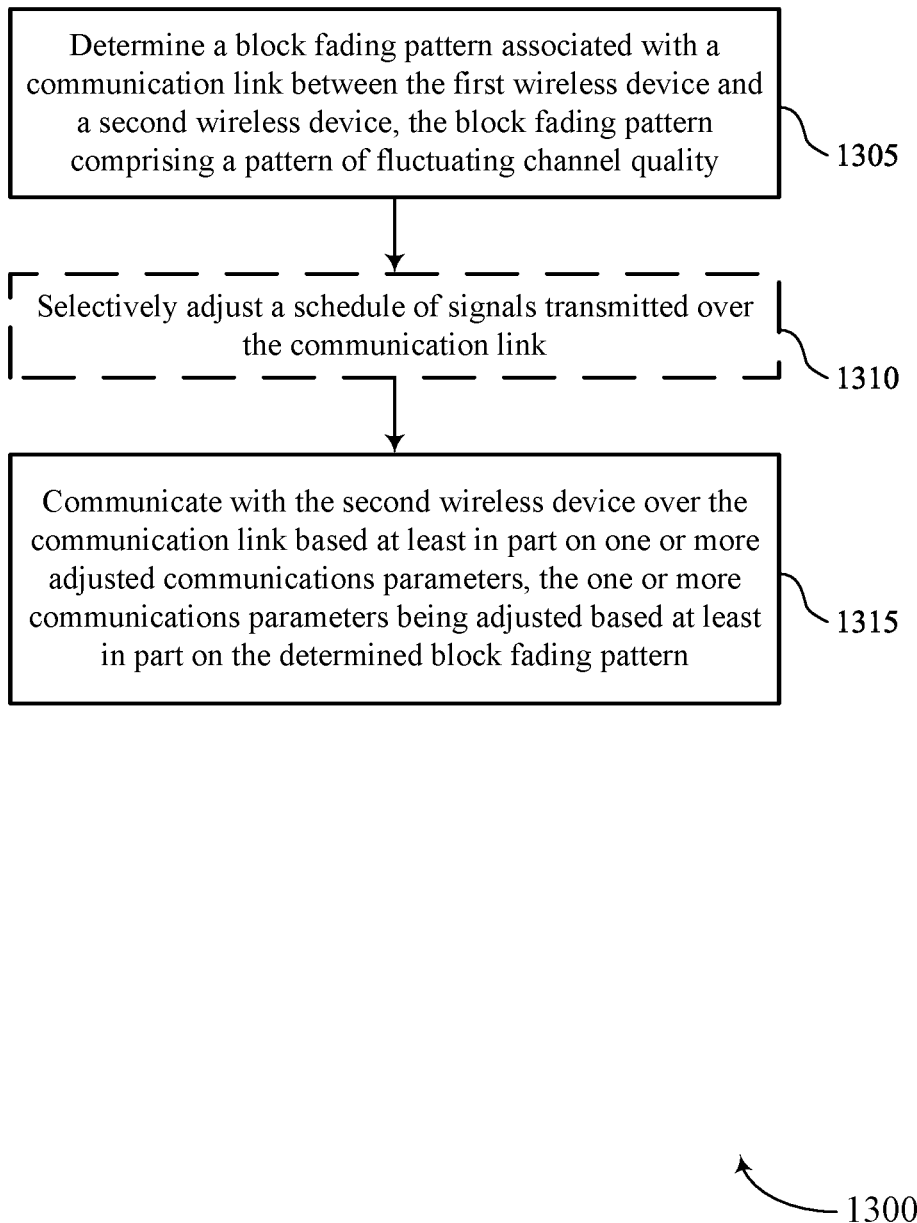

FIG. 13 shows a flowchart illustrating a method 1300 that supports estimation and utilization of a block fading wireless channel in accordance with one or more aspects of the present disclosure. The operations of the method 1300 may be implemented by a UE or a base station or its components as described herein. For example, the operations of the method 1300 may be performed by a UE 115 or a base station 105 as described with reference to FIGS. 1 through 10. In some examples, a UE or a base station may execute a set of instructions to control the functional elements of the UE or the base station to perform the described functions.

Additionally or alternatively, the UE or the base station may perform aspects of the described functions using special-purpose hardware.

At 1305, the method may include determining a block fading pattern associated with a communication link between the first wireless device and a second wireless device, the block fading pattern including a pattern of fluctuating channel quality. The operations of 1305 may be performed in accordance with examples as disclosed herein. In some examples, aspects of the operations of 1305 may be performed by a block fading manager 825 as described with reference to FIG. 8.

At 1310, in some examples, the method may include selectively adjusting a schedule of signals transmitted over the communication link. The operations of 1310 may be performed in accordance with examples as disclosed herein. In some examples, aspects of the operations of 1310 may be performed by a scheduling manager 845 as described with reference to FIG. 8.

At 1315, the method may include communicating with the second wireless device over the communication link based on one or more adjusted communications parameters, the one or more communications parameters being adjusted based on the determined block fading pattern. The operations of 1315 may be performed in accordance with examples as disclosed herein. In some examples, aspects of the operations of 1315 may be performed by a communications component 830 as described with reference to FIG. 8.

Figure 14:
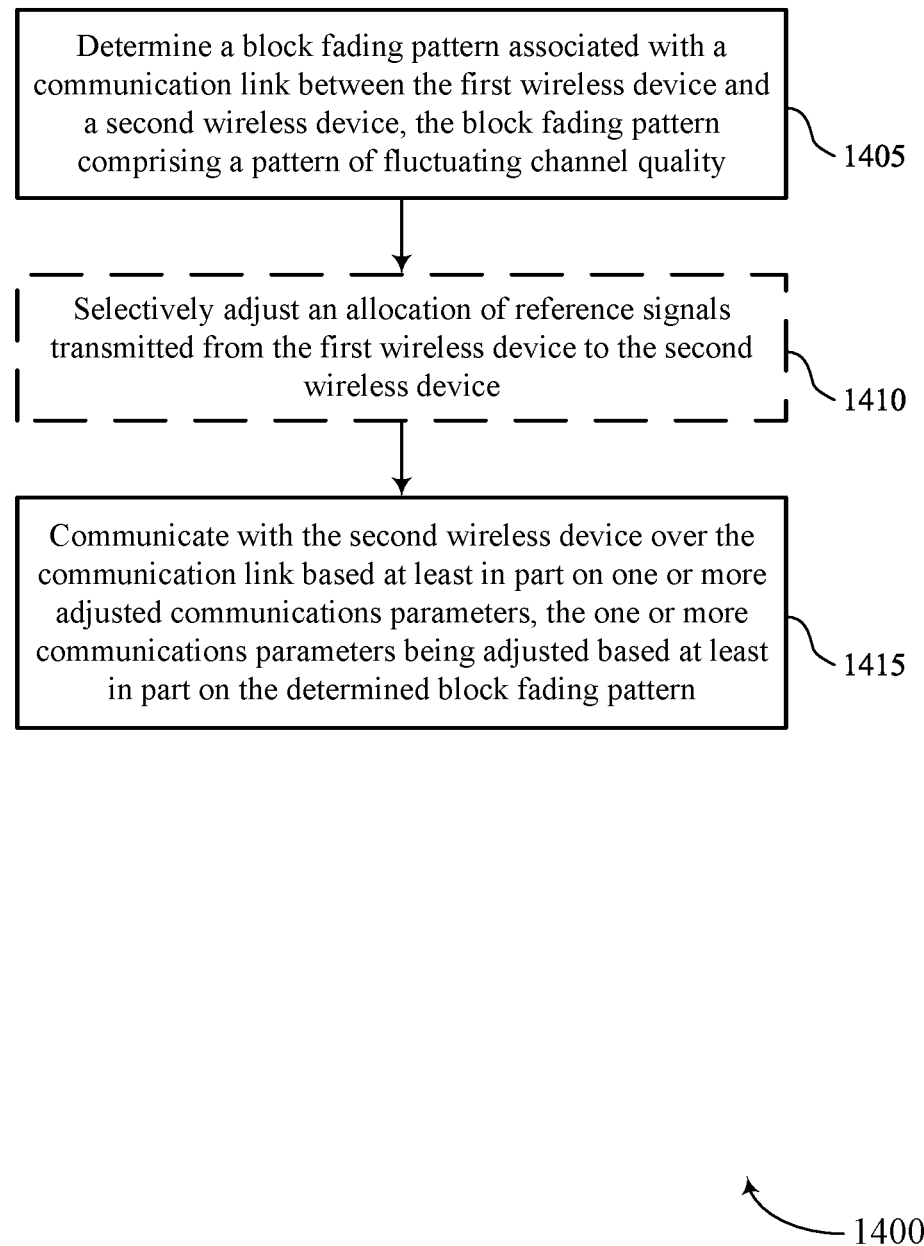

FIG. 14 shows a flowchart illustrating a method 1400 that supports estimation and utilization of a block fading wireless channel in accordance with one or more aspects of the present disclosure. The operations of the method 1400 may be implemented by a UE or a base station or its components as described herein. For example, the operations of the method 1400 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include determining a block fading pattern associated with a communication link between the first wireless device and a second wireless device, the block fading pattern including a pattern of fluctuating channel quality. The operations of 1405 may be performed in accordance with examples as disclosed herein. In some examples, aspects of the operations of 1405 may be performed by a block fading manager 825 as described with reference to FIG. 8.

At 1410, in some examples, the method may include selectively adjusting an allocation of reference signals transmitted from the first wireless device to the second wireless device. The operations of 1410 may be performed in accordance with examples as disclosed herein. In some examples, aspects of the operations of 1410 may be performed by a reference signal allocation manager 850 as described with reference to FIG. 8.

At 1415, the method may include communicating with the second wireless device over the communication link based on one or more adjusted communications parameters, the one or more communications parameters being adjusted based on the determined block fading pattern. The operations of 1415 may be performed in accordance with examples as disclosed herein. In some examples, aspects of the operations of 1415 may be performed by a communications component 830 as described with reference to FIG. 8.

Figure 15:
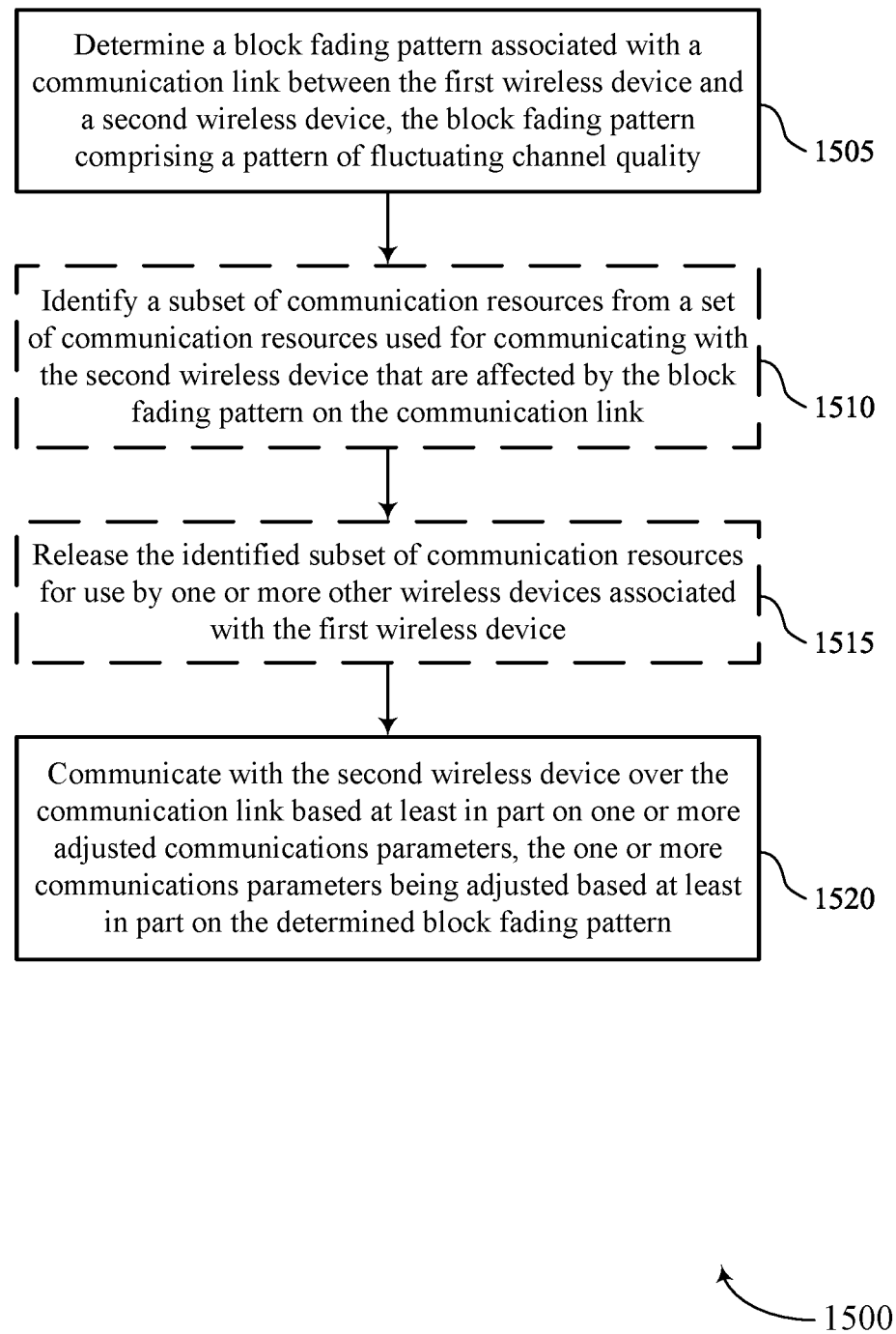

FIG. 15 shows a flowchart illustrating a method 1500 that supports estimation and utilization of a block fading wireless channel in accordance with one or more aspects of the present disclosure. The operations of the method 1500 may be implemented by a UE or a base station or its components as described herein. For example, the operations of the method 1500 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include determining a block fading pattern associated with a communication link between the first wireless device and a second wireless device, the block fading pattern including a pattern of fluctuating channel quality. The operations of 1505 may be performed in accordance with examples as disclosed herein. In some examples, aspects of the operations of 1505 may be performed by a block fading manager 825 as described with reference to FIG. 8.

At 1510, in some examples, the method may include identifying a subset of communication resources from a set of communication resources used for communicating with the second wireless device that are affected by the block fading pattern on the communication link. The operations of 1510 may be performed in accordance with examples as disclosed herein. In some examples, aspects of the operations of 1510 may be performed by a communications component 830 as described with reference to FIG. 8.

At 1515, in some examples, the method may include releasing the identified subset of communication resources for use by one or more other wireless devices associated with the first wireless device. The operations of 1515 may be performed in accordance with examples as disclosed herein. In some examples, aspects of the operations of 1515 may be performed by a communications component 830 as described with reference to FIG. 8.

At 1520, the method may include communicating with the second wireless device over the communication link based on one or more adjusted communications parameters, the one or more communications parameters being adjusted based on the determined block fading pattern. The operations of 1520 may be performed in accordance with examples as disclosed herein. In some examples, aspects of the operations of 1520 may be performed by a communications component 830 as described with reference to FIG. 8.

Figure 16:
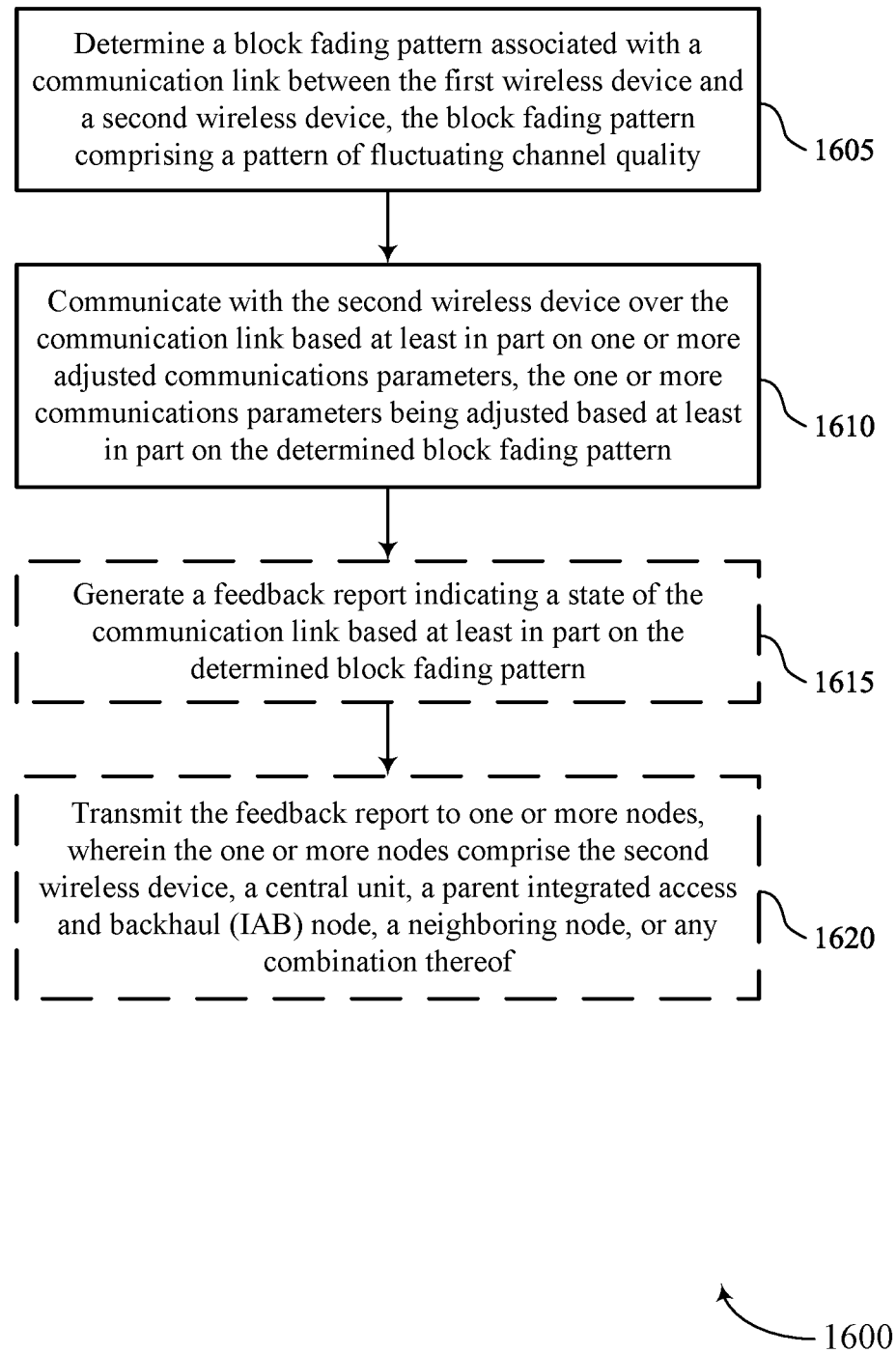

FIG. 16 shows a flowchart illustrating a method 1600 that supports estimation and utilization of a block fading wireless channel in accordance with one or more aspects of the present disclosure. The operations of the method 1600 may be implemented by a UE or a base station or its components as described herein. For example, the operations of the method 1600 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include determining a block fading pattern associated with a communication link between the first wireless device and a second wireless device, the block fading pattern including a pattern of fluctuating channel quality. The operations of 1605 may be performed in accordance with examples as disclosed herein. In some examples, aspects of the operations of 1605 may be performed by a block fading manager 825 as described with reference to FIG. 8.

At 1610, the method may include communicating with the second wireless device over the communication link based on one or more adjusted communications parameters, the one or more communications parameters being adjusted based on the determined block fading pattern. The operations of 1610 may be performed in accordance with examples as disclosed herein. In some examples, aspects of the operations of 1610 may be performed by a communications component 830 as described with reference to FIG. 8.

At 1615, in some examples, the method may include generating a feedback report indicating a state of the communication link based on the determined block fading pattern. The operations of 1615 may be performed in accordance with examples as disclosed herein. In some examples, aspects of the operations of 1615 may be performed by a feedback report manager 875 as described with reference to FIG. 8.

At 1620, in some examples, the method may include transmitting the feedback report to one or more nodes, where the one or more nodes include the second wireless device, a central unit, a parent IAB node, a neighboring node, or any combination thereof. The operations of 1620 may be performed in accordance with examples as disclosed herein. In some examples, aspects of the operations of 1620 may be performed by a feedback report manager 875 as described with reference to FIG. 8.

Figure 17:
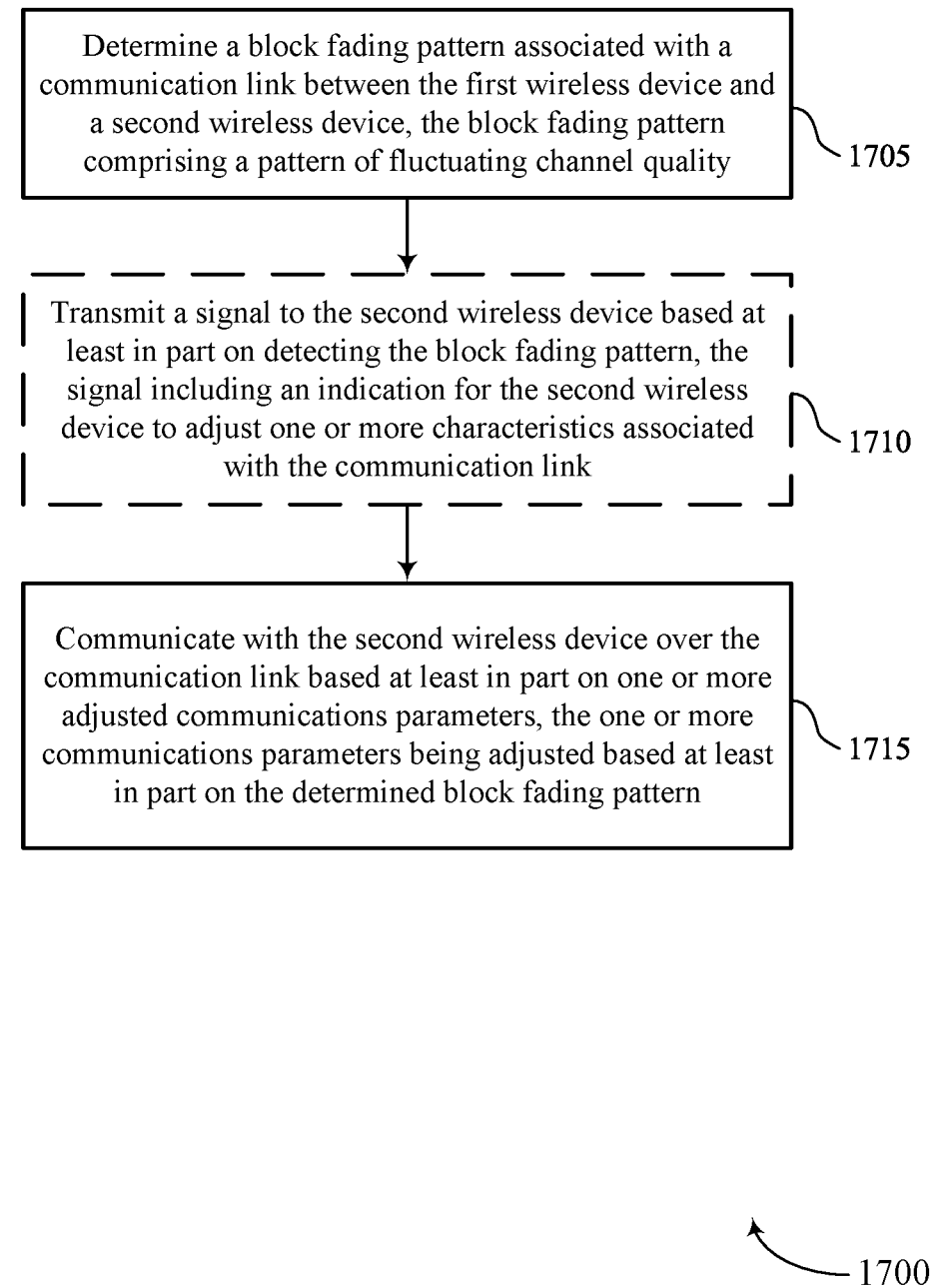

FIG. 17 shows a flowchart illustrating a method 1700 that supports estimation and utilization of a block fading wireless channel in accordance with one or more aspects of the present disclosure. The operations of the method 1700 may be implemented by a UE or a base station or its components as described herein. For example, the operations of the method 1700 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1705, the method may include determining a block fading pattern associated with a communication link between the first wireless device and a second wireless device, the block fading pattern including a pattern of fluctuating channel quality. The operations of 1705 may be performed in accordance with examples as disclosed herein. In some examples, aspects of the operations of 1705 may be performed by a block fading manager 825 as described with reference to FIG. 8.

At 1710, in some examples, the method may include transmitting a signal to the second wireless device based on detecting the block fading pattern, the signal including an indication for the second wireless device to adjust one or more characteristics associated with the communication link. The operations of 1710 may be performed in accordance with examples as disclosed herein. In some examples, aspects of the operations of 1710 may be performed by a link configuration manager 860 as described with reference to FIG. 8.

At 1715, the method may include communicating with the second wireless device over the communication link based on one or more adjusted communications parameters, the one or more communications parameters being adjusted based on the determined block fading pattern. The operations of 1715 may be performed in accordance with examples as disclosed herein. In some examples, aspects of the operations of 1715 may be performed by a communications component 830 as described with reference to FIG. 8.

The following provides an overview of aspects of the present disclosure:

Aspect 1: A method for wireless communications at a first wireless device, comprising: determining a block fading pattern associated with a communication link between the first wireless device and a second wireless device, the block fading pattern comprising a pattern of fluctuating channel quality; and communicating with the second wireless device over the communication link based at least in part on one or more adjusted communications parameters, the one or more communications parameters being adjusted based at least in part on the determined block fading pattern.

Aspect 2: The method of aspect 1, further comprising: transmitting, to one or more other devices comprising at least the second wireless device, signaling that indicates one or more parameters associated with the block fading pattern, the one or more parameters comprising a periodicity of the block fading pattern, a duration of the block fading pattern, an offset of the block fading pattern, a strength of the block fading pattern, a quality metric associated with the block fading pattern, or any combination thereof.

Aspect 3: The method of aspect 2, wherein transmitting the signaling comprises: transmitting the signaling via a sidelink communication link, an uplink communication link, a downlink communication link, a backhaul link, or any combination thereof, wherein each of the first wireless device and the second wireless device is a UE, a base station, or a network node.

Aspect 4: The method of any of aspects 2 through 3, wherein the signaling comprises RRC signaling, DCI, SCI, UCI, a MAC-CE, or any combination thereof that conveys an indication of the one or more parameters associated with the block fading pattern.

Aspect 5: The method of any of aspects 1 through 4, wherein determining the block fading pattern comprises: receiving one or more signals from the second wireless device over the communication link; and determining the block fading pattern based at least in part on measurements of the one or more signals received from the second wireless device.

Aspect 6: The method of any of aspects 1 through 4, wherein determining the block fading pattern comprises: receiving a measurement report from at least one of the second wireless device or a third wireless device that indicates one or more parameters associated with the block fading pattern, the one or more parameters comprising a periodicity of the block fading pattern, a duration of the block fading pattern, an offset of the block fading pattern, a strength of the block fading pattern, a quality metric associated with the block fading pattern, or any combination thereof; and determining the block fading pattern based at least in part on the received measurement report and the one or more parameters.

Aspect 7: The method of any of aspects 1 through 4, wherein determining the block fading pattern comprises: transmitting one or more signals to the second wireless device over the communication link; receiving one or more feedback messages from the second wireless device in response to the transmitted one or more signals, the one or more feedback messages comprising one or more parameters associated with the block fading pattern, wherein the one or more parameters comprise a periodicity of the block fading pattern, a duration of the block fading pattern, an offset of the block fading pattern, a strength of the block fading pattern, a quality metric associated with the block fading pattern, or any combination thereof, and determining the block fading pattern based at least in part on the one or more feedback messages received from the second wireless device and the one or more parameters.

Aspect 8: The method of any of aspects 1 through 4, wherein determining the block fading pattern comprises: communicating with a third wireless device different from the second wireless device; and determining the block fading pattern based at least in part on communicating with the third wireless device.

Aspect 9: The method of any of aspects 1 through 8, further comprising: selectively adjusting a schedule of signals transmitted over the communication link.

Aspect 10: The method of any of aspects 1 through 9, further comprising: selectively adjusting an allocation of reference signals transmitted from the first wireless device to the second wireless device.

Aspect 11: The method of any of aspects 1 through 10, further comprising: selectively adjusting a beamforming configuration for the communication link between the first wireless device and the second wireless device.

Aspect 12: The method of aspect 11, further comprising: selectively adjusting a set of beam directions, a beam sweeping pattern, a beam sweeping periodicity, a beam sweeping order, or any combination thereof.

Aspect 13: The method of any of aspects 1 through 12, further comprising: selectively adjusting a link management configuration used by the first wireless device or the second wireless device for the communication link, the link management configuration comprising one or more of a set of link management parameters or a set of timers associated with determining a link failure of the communication link Aspect 14: The method of any of aspects 1 through 13, further comprising: selectively adjusting one or more measurement parameters for measuring the communication link, the one or more measurement parameters comprising a filtering coefficient for beam measurements, a filtering coefficient for channel measurements, or any combination thereof.

Aspect 15: The method of any of aspects 1 through 14, further comprising: selectively adjusting a resource configuration associated with the communication link, the resource configuration comprising a TDD configuration, a slot format configuration, or any combination thereof.

Aspect 16: The method of any of aspects 1 through 15, further comprising: identifying a subset of communication resources from a set of communication resources used for communicating with the second wireless device that are affected by the block fading pattern on the communication link; and releasing the identified subset of communication resources for use by one or more other wireless devices associated with the first wireless device.

Aspect 17: The method of aspect 16, wherein releasing the identified subset of communication resources comprises: releasing the sub-set of communication resources for use by an IAB node associated with the first wireless device.

Aspect 18: The method of any of aspects 1 through 17, further comprising: generating a feedback report indicating a state of the communication link based at least in part on the determined block fading pattern; and transmitting the feedback report to one or more nodes, wherein the one or more nodes comprise the second wireless device, a CU, a parent IAB node, a neighboring node, or any combination thereof.

Aspect 19: The method of any of aspects 1 through 18, further comprising: selectively adjusting a channel estimation procedure, an interference cancellation procedure, synchronization parameters, a receiver algorithm, or any combination thereof.

Aspect 20: The method of any of aspects 1 through 19, further comprising: transmitting a signal to the second wireless device based at least in part on detecting the block fading pattern, the signal including an indication for the second wireless device to adjust one or more characteristics associated with the communication link.

Aspect 21: The method of aspect 20, wherein the indication comprises a request for the second wireless device to refrain from transmitting signals to the first wireless device during one or more time periods corresponding to the determined block fading pattern.

Aspect 22: The method of any of aspects 20 through 21, wherein transmitting the signal to the second wireless device comprises: generating a measurement report based at least in part on measuring one or more signals received over the communication link; and transmitting, to the second wireless device, the measurement report including an indication of the determined block fading pattern.

Aspect 23: The method of any of aspects 1 through 22, wherein determining the block fading pattern comprises: transmitting one or more signals to the second wireless device via a plurality of beams based at least in part on a periodic beam transmission pattern; and determining the block fading pattern based at least in part on the periodic beam transmission pattern, wherein the block fading pattern comprises a periodic block fading pattern in accordance with the periodic beam transmission pattern.

Aspect 24: The method of any of aspects 1 through 22, wherein determining the block fading pattern comprises: communicating with the second wireless device via a relay device that relays communications between the first wireless device and the second wireless device; and determining the block fading pattern based at least in part on the communications relayed by the relay device over the communication link.

Aspect 25: The method of any of aspects 1 through 22, wherein determining the block fading pattern comprises: communicating with the second wireless device based at least in part on a resource allocation scheme; and determining the block fading pattern based at least in part on the resource allocation scheme.

Aspect 26: An apparatus for wireless communications at a first wireless device, comprising a processor; and memory coupled with the processor, the processor and memory configured to perform a method of any of aspects 1 through 25.

Aspect 27: An apparatus for wireless communications at a first wireless device, comprising at least one means for performing a method of any of aspects 1 through 25.

Aspect 28: A non-transitory computer-readable medium storing code for wireless communications at a first wireless device, the code comprising instructions executable by a processor to perform a method of any of aspects 1 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
one or more memories; and
one or more processors coupled with the one or more memories and configured to cause the UE to:
determine, at the UE, a block fading pattern associated with a communication link between the UE and a second wireless device, the block fading pattern comprising a pattern of fluctuating channel quality and corresponding to a change in propagation of one or more signals transmitted over the communication link;
selectively adjust, at the UE, one or more measurement parameters using the block fading pattern determined at the UE, the one or more measurement parameters comprising one or more filtering coefficients for beam measurements, one or more filtering coefficients for channel measurements, or both; and
communicate with the second wireless device over the communication link based at least in part on one or more communications parameters, wherein the one or more communications parameters are based at least in part on the determined block fading pattern.

2. The apparatus of claim 1, wherein the one or more processors are configured to cause the UE to:
transmit, to one or more other devices comprising at least the second wireless device, signaling that indicates one or more parameters associated with the block fading pattern, the one or more parameters comprising a periodicity of the block fading pattern, a duration of the block fading pattern, an offset of the block fading pattern, a strength of the block fading pattern, a quality metric associated with the block fading pattern, or any combination thereof.

3. The apparatus of claim 2, wherein to transmit the signaling, the one or more processors are configured to cause the UE to:
transmit the signaling via a sidelink communication link, an uplink communication link, a downlink communication link, a backhaul link, or any combination thereof, wherein the second wireless device is another UE, a base station, or a network node.

4. The apparatus of claim 2, wherein the signaling comprises radio resource control signaling, downlink control information, sidelink control information, uplink control information, a medium access control-control element (MAC-CE), or any combination thereof that conveys an indication of the one or more parameters associated with the block fading pattern.

5. The apparatus of claim 1, wherein to determine the block fading pattern, the one or more processors are configured to cause the UE to:
receive the one or more signals from the second wireless device over the communication link; and
determine the block fading pattern based at least in part on measurements of the one or more signals received from the second wireless device.

6. The apparatus of claim 1, wherein to determine the block fading pattern, the one or more processors are configured to cause the UE to:
receive a measurement report from at least one of the second wireless device or a third wireless device that indicates one or more parameters associated with the block fading pattern, the one or more parameters comprising a periodicity of the block fading pattern, a duration of the block fading pattern, an offset of the block fading pattern, a strength of the block fading pattern, a quality metric associated with the block fading pattern, or any combination thereof; and determine the block fading pattern based at least in part on the received measurement report and the one or more parameters.

7. The apparatus of claim 1, wherein to determine the block fading pattern, the one or more processors are configured to cause the UE to:
transmit the one or more signals to the second wireless device over the communication link;
receive one or more feedback messages from the second wireless device in response to the transmitted one or more signals, the received one or more feedback messages comprising one or more parameters associated with the block fading pattern, wherein the one or more parameters comprise a periodicity of the block fading pattern, a duration of the block fading pattern, an offset of the block fading pattern, a strength of the block fading pattern, a quality metric associated with the block fading pattern, or any combination thereof; and
determine the block fading pattern based at least in part on the received one or more feedback messages from the second wireless device and the one or more parameters.

8. The apparatus of claim 1, wherein to determine the block fading pattern, the one or more processors are configured to cause the UE to:
communicate with a third wireless device different from the second wireless device; and
determine the block fading pattern based at least in part on communicating with the third wireless device.

9. The apparatus of claim 1, wherein the one or more processors are configured to cause the UE to:
selectively adjust a schedule of signals transmitted over the communication link.

10. The apparatus of claim 1, wherein the one or more processors are configured to cause the UE to:
selectively adjust an allocation of reference signals transmitted from the UE to the second wireless device.

11. The apparatus of claim 1, wherein the one or more processors are configured to cause the UE to:
selectively adjust a beamforming configuration for the communication link between the UE and the second wireless device.

12. The apparatus of claim 11, wherein the one or more processors are configured to cause the UE to:
selectively adjust a set of beam directions, a beam sweeping pattern, a beam sweeping periodicity, a beam sweeping order, or any combination thereof.

13. The apparatus of claim 1, wherein the one or more processors are configured to cause the UE to:
selectively adjust a link management configuration used by the UE or the second wireless device for the communication link, the link management configuration comprising one or more of a set of link management parameters or a set of timers associated with a link failure of the communication link.

14. The apparatus of claim 1, wherein the one or more processors are configured to cause the UE to:
selectively adjust a resource configuration associated with the communication link, the resource configuration comprising a time division duplexing configuration, a slot format configuration, or any combination thereof.

15. The apparatus of claim 1, wherein the one or more processors are configured to cause the UE to:
identify a subset of communication resources from a set of communication resources used for communication with the second wireless device that are affected by the block fading pattern on the communication link; and
release the identified subset of communication resources for use by one or more other wireless devices associated with the UE.

16. The apparatus of claim 15, wherein to release the identified subset of communication resources, the one or more processors are configured to cause the UE to:
release the subset of communication resources for use by an integrated access and backhaul (IAB) node associated with the UE.

17. The apparatus of claim 1, wherein the one or more processors are configured to cause the UE to:
generate a feedback report that indicates a state of the communication link based at least in part on the determined block fading pattern; and
transmit the feedback report to one or more nodes, wherein the one or more nodes comprise the second wireless device, a central unit, a parent integrated access and backhaul (IAB) node, a neighboring node, or any combination thereof.

18. The apparatus of claim 1, wherein the one or more processors are configured to cause the UE to:
selectively adjust a channel estimation procedure, an interference cancellation procedure, synchronization parameters, a receiver algorithm, or any combination thereof.

19. The apparatus of claim 1, wherein the one or more processors are configured to cause the UE to:
transmit a signal to the second wireless device based at least in part on detecting the block fading pattern, the signal including an indication for the second wireless device to adjust one or more characteristics associated with the communication link.

20. The apparatus of claim 19, wherein the indication comprises a request for the second wireless device to refrain from transmitting signals to the UE during one or more time periods corresponding to the determined block fading pattern.

21. The apparatus of claim 19, wherein to transmit the signal to the second wireless device, the one or more processors are configured to cause the UE to:
generate a measurement report based at least in part on measuring one or more first signals received over the communication link; and
transmit, to the second wireless device, the measurement report including an indication of the determined block fading pattern.

22. The apparatus of claim 1, wherein to determine the block fading pattern, the one or more processors are configured to cause the UE to:
transmit the one or more signals to the second wireless device via a plurality of beams based at least in part on a periodic beam transmission pattern; and
determine the block fading pattern based at least in part on the periodic beam transmission pattern, wherein the block fading pattern comprises a periodic block fading pattern in accordance with the periodic beam transmission pattern.

23. The apparatus of claim 1, wherein to determine the block fading pattern, the one or more processors are configured to cause the UE to:
communicate with the second wireless device via a relay device that relays communications between the UE and the second wireless device; and
determine the block fading pattern based at least in part on the communications relayed by the relay device over the communication link.

24. The apparatus of claim 1, wherein to determine the block fading pattern, the one or more processors are configured to cause the UE to:
communicate with the second wireless device based at least in part on a resource allocation scheme; and
determine the block fading pattern based at least in part on the resource allocation scheme.

25. A method for wireless communications at a UE, comprising:
determining, at the UE, a block fading pattern associated with a communication link between the UE and a second wireless device, the block fading pattern comprising a pattern of fluctuating channel quality and corresponding to a change in propagation of one or more signals transmitted over the communication link;
selectively adjusting, at the UE, one or more measurement parameters using the block fading pattern determined at the UE, the one or more measurement parameters comprising one or more filtering coefficients for beam measurements, one or more filtering coefficients for channel measurements, or both; and
communicating with the second wireless device over the communication link based at least in part on one or more communications parameters, wherein the one or more communications parameters are based at least in part on the determined block fading pattern.

26. The method of claim 25, further comprising:
transmitting, to one or more other devices comprising at least the second wireless device, signaling that indicates one or more parameters associated with the block fading pattern, the one or more parameters comprising a periodicity of the block fading pattern, a duration of the block fading pattern, an offset of the block fading pattern, a strength of the block fading pattern, a quality metric associated with the block fading pattern, or any combination thereof.

27. The method of claim 26, wherein the transmitting the signaling comprises:
transmitting the signaling via a sidelink communication link, an uplink communication link, a downlink communication link, a backhaul link, or any combination thereof, wherein the second wireless device is another UE, a base station, or a network node.

28. The method of claim 26, wherein the signaling comprises radio resource control signaling, downlink control information, sidelink control information, uplink control information, a medium access control-control element (MAC-CE), or any combination thereof that conveys an indication of the one or more parameters associated with the block fading pattern.

29. The method of claim 25, wherein the determining the block fading pattern comprises:
receiving the one or more signals from the second wireless device over the communication link; and determining the block fading pattern based at least in part on measurements of the received one or more signals from the second wireless device.

30. The method of claim 25, wherein the determining the block fading pattern comprises:
   receiving a measurement report from at least one of the second wireless device or a third wireless device that indicates one or more parameters associated with the block fading pattern, the one or more parameters comprising a periodicity of the block fading pattern, a duration of the block fading pattern, an offset of the block fading pattern, a strength of the block fading pattern, a quality metric associated with the block fading pattern, or any combination thereof; and
   determining the block fading pattern based at least in part on the received measurement report and the one or more parameters.

31. The method of claim 25, wherein the determining the block fading pattern comprises:
   transmitting the one or more signals to the second wireless device over the communication link;
   receiving one or more feedback messages from the second wireless device in response to the transmitted one or more signals, the one or more feedback messages comprising one or more parameters associated with the block fading pattern, wherein the one or more parameters comprise a periodicity of the block fading pattern, a duration of the block fading pattern, an offset of the block fading pattern, a strength of the block fading pattern, a quality metric associated with the block fading pattern, or any combination thereof; and
   determining the block fading pattern based at least in part on the one or more feedback messages received from the second wireless device and the one or more parameters.

32. The method of claim 25, wherein the determining the block fading pattern comprises:
   communicating with a third wireless device different from the second wireless device; and
   determining the block fading pattern based at least in part on communicating with the third wireless device.

33. An apparatus for wireless communications at a user equipment (UE), comprising:
   means for determining, at the UE, a block fading pattern associated with a communication link between the UE and a second wireless device, the block fading pattern comprising a pattern of fluctuating channel quality and corresponding to a change in propagation of one or more signals transmitted over the communication link;
   means for selectively adjusting, at the UE, one or more measurement parameters using the block fading pattern determined at the UE, the one or more measurement parameters comprising one or more filtering coefficients for beam measurements, one or more filtering coefficients for channel measurements, or both; and
   means for communicating with the second wireless device over the communication link based at least in part on one or more communications parameters, wherein the one or more communications parameters are based at least in part on the determined block fading pattern.

34. A non-transitory computer-readable medium storing code for wireless communications at a user equipment (UE), the code comprising instructions executable by one or more processors to cause the UE to:
   determine, at the UE, a block fading pattern associated with a communication link between the UE and a second wireless device, the block fading pattern comprising a pattern of fluctuating channel quality and corresponding to a change in propagation of one or more signals transmitted over the communication link;
   selectively adjust, at the UE, one or more measurement parameters using the block fading pattern determined at the UE, the one or more measurement parameters comprising one or more filtering coefficients for beam measurements, one or more filtering coefficients for channel measurements, or both; and
   communicate with the second wireless device over the communication link based at least in part on one or more communications parameters, wherein the one or more communications parameters are based at least in part on the determined block fading pattern.

* * * * *